(12) United States Patent
Moestl

(10) Patent No.: US 7,774,337 B2
(45) Date of Patent: Aug. 10, 2010

(54) METHOD FOR CONTROLLING A RELATIONAL DATABASE SYSTEM

(75) Inventor: Matthias Moestl, Vienna (AT)

(73) Assignee: Mediareif Moestl & Reif Kommunikations-und Informationstechnologien OEG, Vienna (AT)

( * ) Notice: Subject to any disclaimer, the term of this patent is extended or adjusted under 35 U.S.C. 154(b) by 304 days.

(21) Appl. No.: 11/775,317

(22) Filed: Jul. 10, 2007

(65) Prior Publication Data

US 2008/0016038 A1    Jan. 17, 2008

Related U.S. Application Data

(60) Provisional application No. 60/819,991, filed on Jul. 11, 2006.

(51) Int. Cl.
 *G06F 17/30* (2006.01)
(52) U.S. Cl. .................. 707/721; 707/613; 707/691; 707/707; 707/709; 707/723; 707/748; 707/759; 707/825; 704/1; 704/9; 704/237
(58) Field of Classification Search ............ 707/1, 707/2, 4, 5, 6, 7, 9, 10, 201, 205; 704/1, 704/9, 237
See application file for complete search history.

(56) References Cited

U.S. PATENT DOCUMENTS

| | | | |
|---|---|---|---|
| 5,519,859 A | | 5/1996 | Grace |
| 5,600,829 A | | 2/1997 | Tsatalos et al. |
| 5,826,077 A | * | 10/1998 | Blakeley et al. ............... 707/4 |
| 5,875,334 A | * | 2/1999 | Chow et al. ................. 717/141 |
| 5,930,785 A | | 7/1999 | Lohman et al. |
| 6,618,719 B1 | * | 9/2003 | Andrei ....................... 707/2 |
| 6,732,091 B1 | | 5/2004 | Middelfart |

(Continued)

FOREIGN PATENT DOCUMENTS

WO    WO0231625 A2    4/2002

(Continued)

OTHER PUBLICATIONS

Chaudhuri S Ed—Association for Computing Machinery: "An Overview of Query Optimization in Relational Systems" Proceedings of the 17th. ACM SIGACT-SIGMOND-SIGART Symposium on Principles of Database Systems. PODS 1998. Seattle, WA, Jun. 1-3, 1998, Proceedings of the ACM SIGACT-SIGMOND-SIGART Symposium on Principles of Database Systems, New York, NY: ACM, US.

*Primary Examiner*—Khanh B Pham
*Assistant Examiner*—Syling Yen
(74) *Attorney, Agent, or Firm*—Paul & Paul

(57) ABSTRACT

A method for controlling a relational database system, with a query statement comprised of keywords being analyzed, with the RTN being formed of independent RTN building blocks. Each RTN building block has an inner, directed decision graph which is defined independently from the inner, directed decision graphs of the other RTN building blocks with at least one decision position along at least one decision path. The inner decision graphs of all RTN building blocks are run by means of the keywords in a selection step and all possible paths of this decision graph are followed until either no match with the respectively selected path is determined by the decision graph and the process is interrupted, or the respectively chosen path is run until the end.

23 Claims, 15 Drawing Sheets

U.S. PATENT DOCUMENTS

| | | |
|---|---|---|
| 6,834,287 B1 | 12/2004 | Folk-Williams et al. |
| 2004/0220923 A1 | 11/2004 | Nica |
| 2004/0220928 A1 | 11/2004 | Evans |
| 2004/0243387 A1* | 12/2004 | De Brabander ................ 704/1 |
| 2005/0076045 A1 | 4/2005 | Stenslet et al. |
| 2006/0253414 A1* | 11/2006 | Mittal et al. ................... 707/1 |
| 2007/0106637 A1 | 5/2007 | Mostl |

FOREIGN PATENT DOCUMENTS

| | | |
|---|---|---|
| WO | WO02091271 A1 | 11/2002 |
| WO | WO02103573 A1 | 12/2002 |

\* cited by examiner

\* ... ANY BUILDING BLOCK IS TO BE INTRODUCED AT THIS POSITION AND RUN

\* ... ANY BUILDING BLOCK IS TO BE INTRODUCED AT THIS POSITION AND RUN

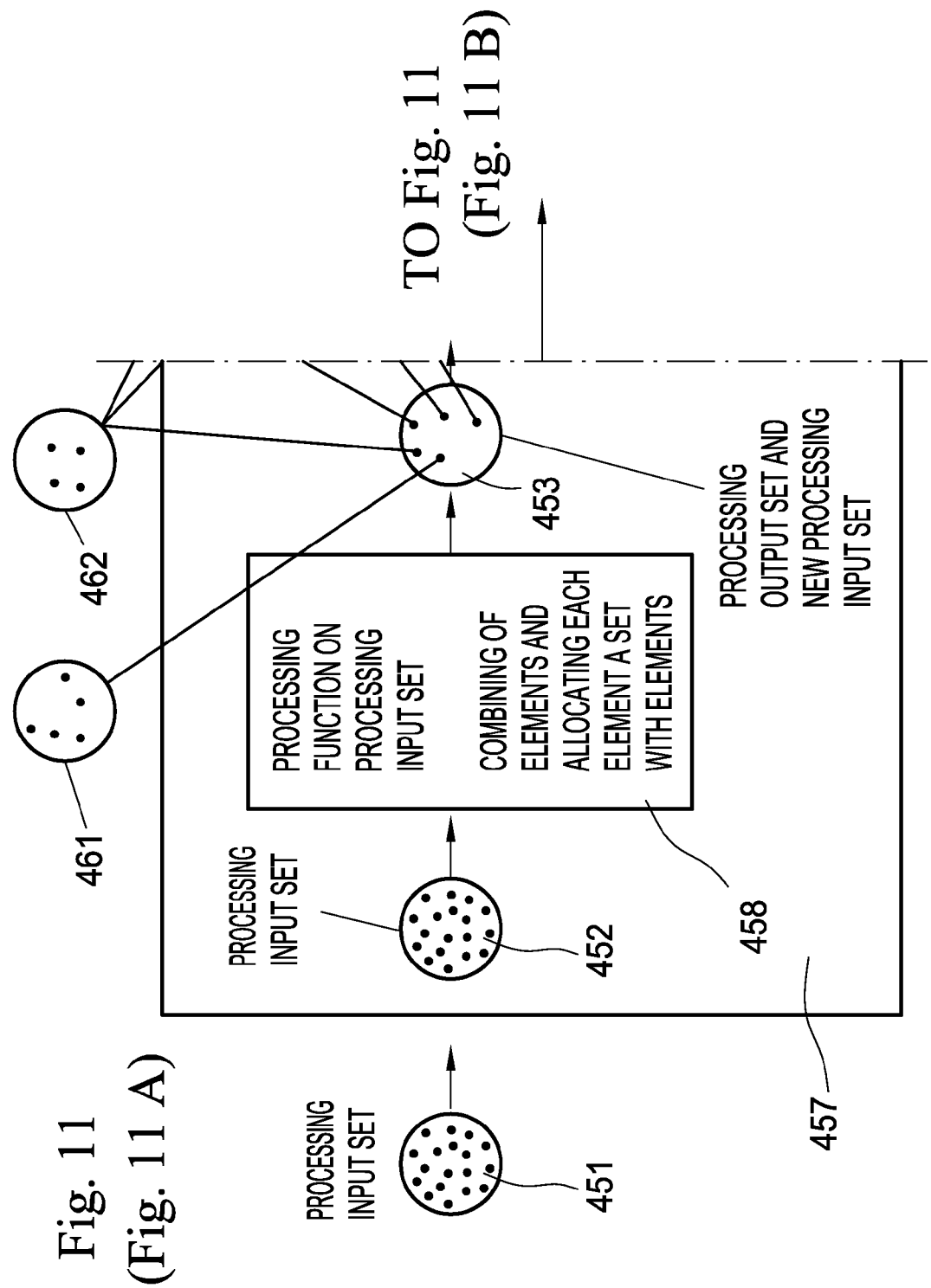

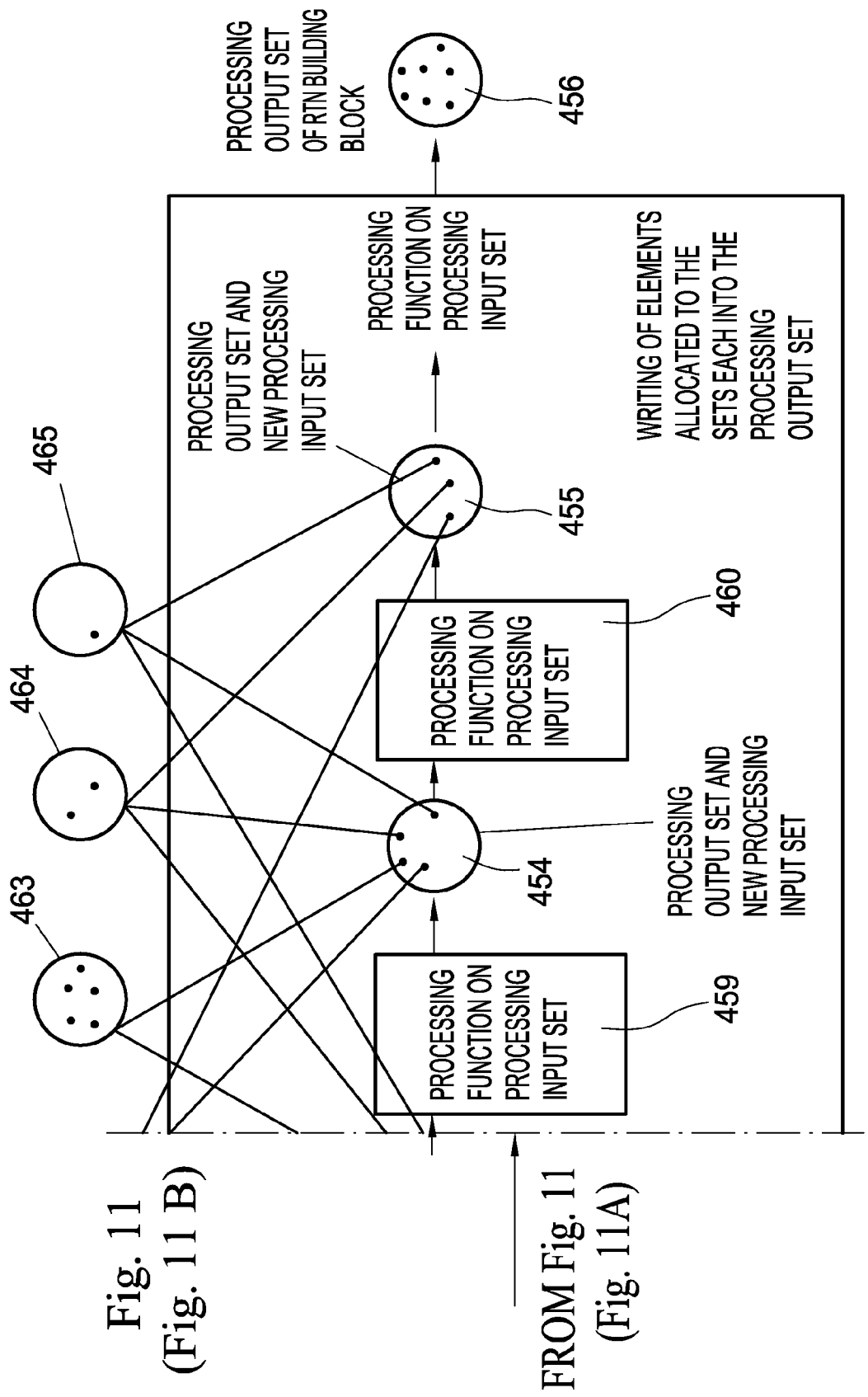
Fig. 11 (Fig. 11B)

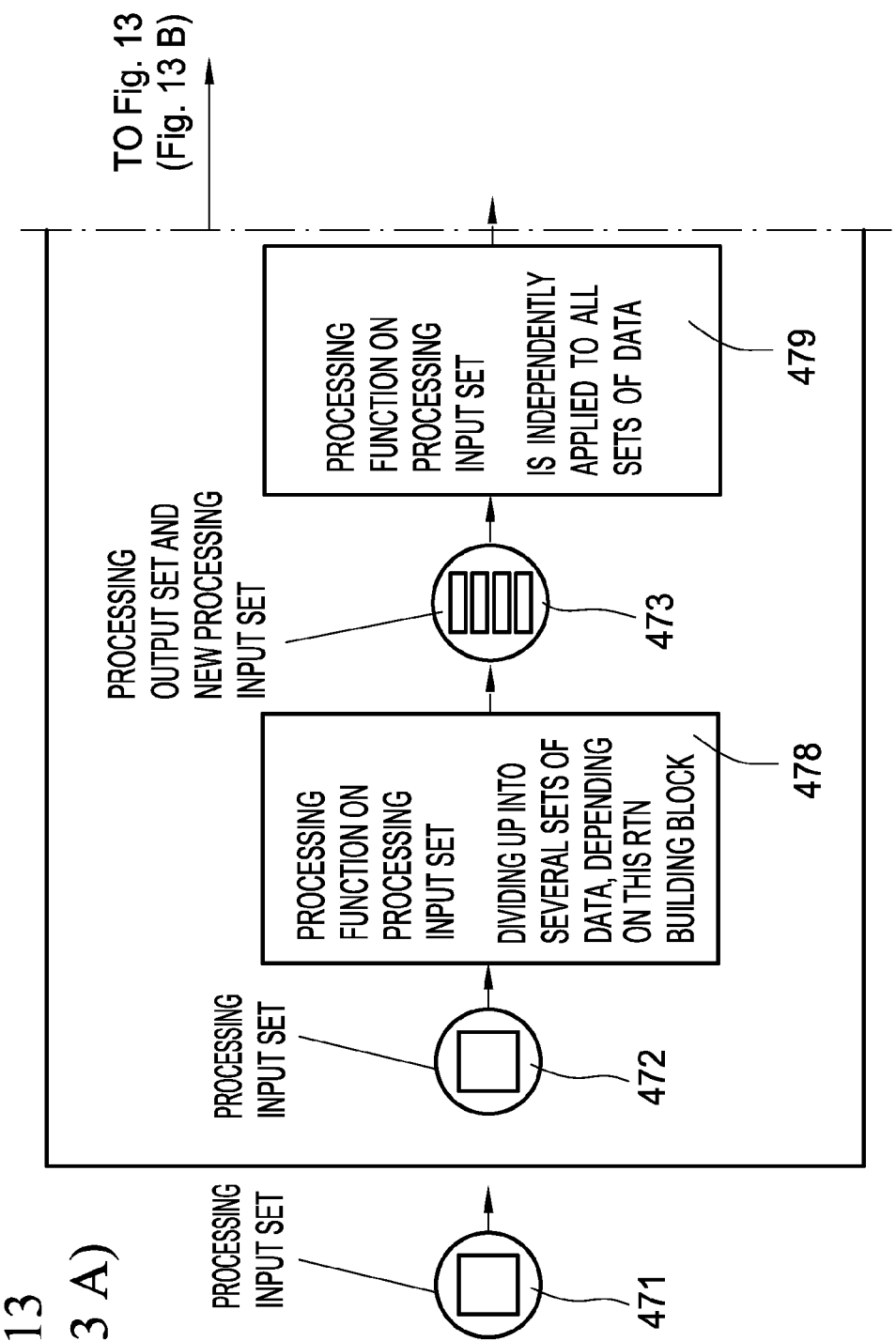
Fig. 13 (Fig. 13 A)

(Fig. 13 B)

Variant 1

Variant 2

METHOD FOR CONTROLLING A RELATIONAL DATABASE SYSTEM

CROSS-REFERENCE TO RELATED APPLICATION

This application claims priority from provisional application Ser. No. 60/819,991 filed Jul. 11, 2006. The complete disclosure of which is herein incorporated.

SUMMARY OF THE INVENTION

The invention concerns a method for controlling a relational database system, with a query statement consisting of keywords first being analyzed by applying a recursive transition network (RTN) wherein the keywords or group of keywords are allocated process-related properties in the order given by the statement after which follows a conversion into control commands and optionally an optimization.

The invention further concerns an associated relational database system, associated data carriers or carrier signals including control information for the relational database system, and associated computer programs and computer program products to carry out the aforementioned method.

Relational database systems are based mostly on SQL, which has difficulties in formulating a query statement despite its high propagation level and continuous development when dealing with more complex queries, and the grammatically constrained degree of freedom leads to an unnecessarily complicated problem description and a resulting non-optimal access code, which involves storage-intensive, hard disk access-intensive and processor-intensive processing.

SQL is a set-processing query language which applies predetermined set-processing functions in a certain, fixed order to each statement and substatement, respectively, on freely definable input quantities for each statement and substatement, respectively.

This relative constraint in the application of SQL arises from the underlying RTN (recursive transient network) logic the processing of which takes place along a given decision graph which provides for a fixed or largely fixed order of keywords and the recursive usability of the entire decision graph at predetermined decision positions while allowing a limited selection of keywords after each keyword. Due to this given order the processing of the statement may be described only by self-nested and/or self-concatenated total runs of the entire decision graph whereby especially with SQL, OQL or the like a processing of defined processing blocks is possible owing to the order determined by the decision graph, whereas it is not possible to introduce new processing blocks the orders of which are freely selectable and repeatable.

Although SQL with the above described naturally available RTN constraints has been designed as Turing complete, in practice quite a few queries are difficult to carry out even for experts and therefore often cause long processing times compared to the theoretically possible processing time, which cannot be attained because the RTN of SQL does not allow for the degrees of freedom in the formulation and use of query statements.

Therefore, it is an object of the invention to state a method of the kind as mentioned above which makes possible a simple and concise description of facts in various levels of difficulty in a query language and the establishment of an improved access plan, and as a result the query result may be calculated and carried out much faster, respectively.

It is a further object of the invention to state a method which increases the understanding and clarity for the user and third parties and allows for an easy accomplishment of modifications or adjustments of existing statements when, for example, starting from a problem further similar problems are to be provided.

To ensure easy applicability the method according to the invention should also be easy to illustrate in a graphical interface.

Defining and upgrading, respectively, new processing functions for the application of the query language which is the basis for the method, should be easy to carry out.

According to the invention, this is achieved by forming the RTN from independent RTN building blocks with each RTN building block having an inner, directed decision graph which is defined independently from the inner, directed decision graphs of the other RTN building blocks with at least one decision position along at least one decision path, running the inner decision graphs of all RTN building blocks by means of the keywords in a selection step and following all possible paths of this decision graph until either no match with the individual path is determined by the decision graph and the process is interrupted or the respectively chosen path is run until the end, with at least one part of the decision paths having a recursive call function on at least one of the decision positions through which one of the RTN building blocks is run as a result of applying the selection step to all RTN building blocks so that any frequently recursively nested execution of the selection step starting from the at least one of the decision positions is made possible, and by generating an access plan for the relational database system from the order of the RTN building blocks and their nesting as a result of the application of the selection steps on all keywords, and by a relational database system comprising at least a relational database, at least a data processing unit and at least a memory which is programmatically set up in such a way that it works according to the aforementioned method according to the invention.

In this way, one can do without the application of the up to now high structural degree in query languages such as SQL, OQL and the like with predetermined processing areas and processing orders such as SELECT, FROM, WHERE, GROUP BY, HAVING, ORDER BY, LIMIT, UNION. By this model, which is applied in SQL where Cartesian products are formed in the FROM part of the query, certain rows of the Cartesian products are eliminated in the WHERE part, certain data fields are combined in the GROUP BY part, certain rows are eliminated in the HAVING part by means of group calculation results, sorting is done by ORDER BY and sets are combined with UNION or other set-uniting operations, the necessary Turing completeness may be achieved so that all data-related solvable problems may be formulated theoretically, but nevertheless due to the high complexity it fails in practice, depending on user competence starting from medium difficult to difficult tasks. Additionally, a great part of all possible queries may be formulated by an expert, but these, depending on the respective problem, may be incorporated into the given processing areas only in a complicated manner because due to the predetermined structuring and order, for example in SQL, this cannot be done in any other way. As it is not possible in many cases to predetermine a direct way of set processing due to the small set of processing areas, it is up to the optimizer intended for this purpose to avoid many of the worst ways, and the individually applied description is to determine the best way. As compared with the theoretically best possible way this may vary strongly therefrom.

Further embodiments of the invention are given in the accompanying claims. In the following the invention is explained in detail by the embodiments shown in the figures.

BRIEF DESCRIPTION OF THE DRAWINGS

FIGS. 8, 9, 10, 11, 12, 13 are each schematic representations of the input set allocations of different RTN building block nestings and special forms, respectively, as applied in embodiments of the method according to the invention.

DETAILED DESCRIPTION OF THE INVENTION

Two very simple examples may serve to illustrate this:

A table "company" is given which includes at least the field "company_name" and "city".

EXAMPLE 1

First Problem: All Companies from Cities with More than 100 Companies

```
One possible description in SQL (prior art):
SELECT companies.*
FROM companies, (SELECT companies.city
   FROM companies
   GROUP BY companies.city
   HAVING (count(*)>100)
   ) AS companies_cities_more_than_100
WHERE (companies.city=companies_cities_more_than_100.city)
```

The set of companies is taken, combined according to city and only those cities are memorized which have more than 100 companies. This set has a Cartesian linkage with the set of companies and there are taken only companies the field "city" of which can also be found in the set of cities with more than 100 companies.

Disadvantage: The set of cities must be stored and the set of the companies must be run twice and compared once with the cities.

One possibe description in RTN building blocks according to the inventive method:

```
One possible description in RTN building blocks according
to the inventive method:
SELECT companies.*
WHERE (companies.city.WHERE([companies.count]>100))
```

The set of companies is taken, for each company it is examined whether more than 100 companies are found in this city. The found companies are output. Naturally, the processing is formulated much better by the optimizer.

EXAMPLE 2

Second Problem: from Each City 100 Random Companies

```
One possible description in SQL (prior art):
SELECT*
FROM (
   SELECT companies.*,row_numberate( ) OVER companies.city
   AS company_of_city
   FROM company
   )
   WHERE (companies_of_city<=100)
```

Number the set of companies, restart with each city, store it in one set and take all elements from this set the numeration of which is <=100.

ONE possible description with flexible RTN building blocks according to an inventive method:

```
ONE possible description with flexible RTN building
blocks according to an inventive method:
SELECT companies.*
BREAKON companies.city
FIRST #100
```

The set of the companies is taken from the corresponding table. BREAKON indicates that the subsequent functions are applied to each company from the same city, i.e. the FIRST 100 companies from each city.

Figure 1:
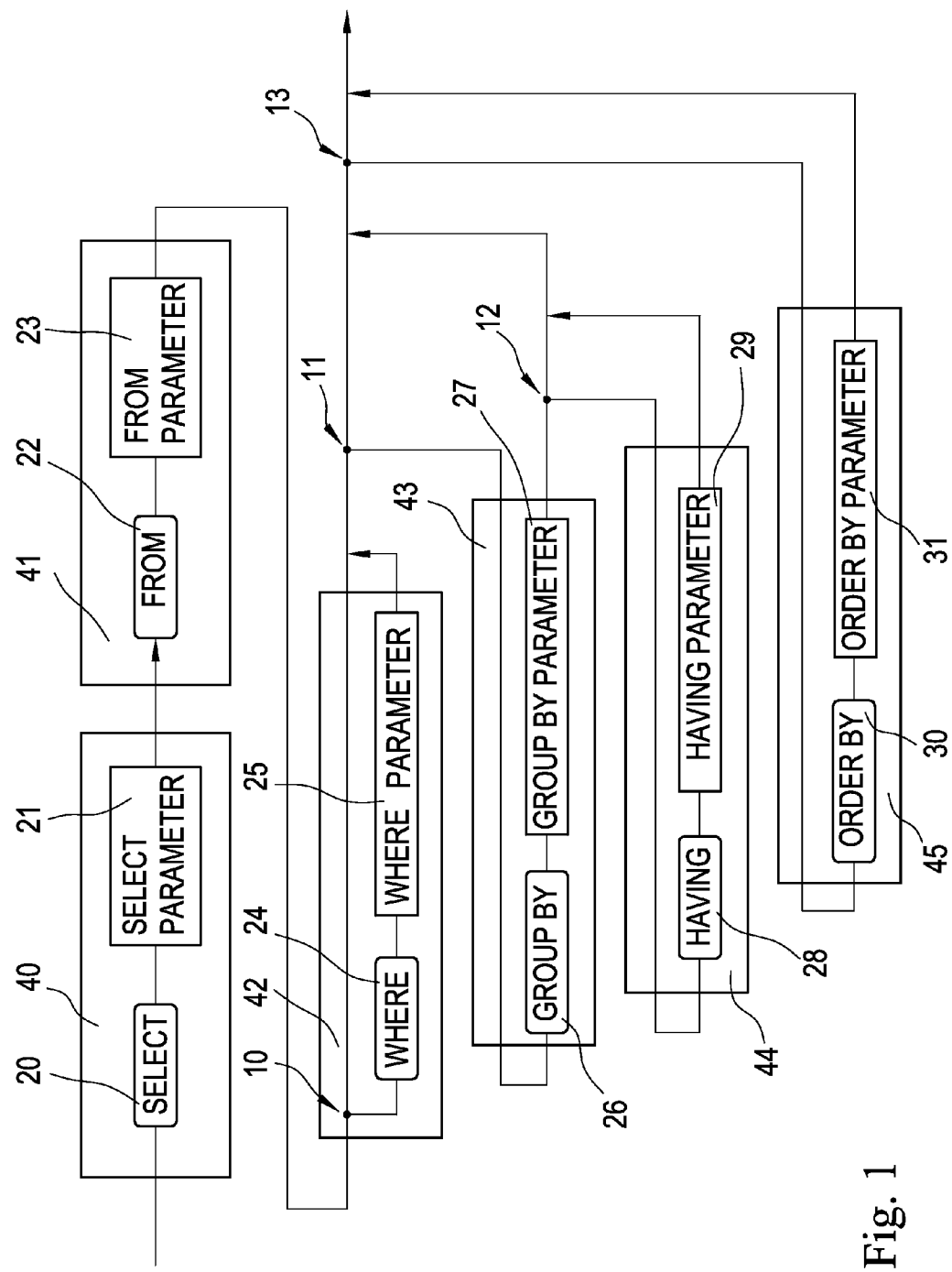
FIG. 1 is a schematic representation of a prior art SQL-RTN.

FIG. 1 shows a simplified prior art decision graph for the SELECT command of the query language SQL from which the schematic structure of the RTN for SQL becomes clear.

Each query statement is formed from a fixedly predetermined order of necessarily successively arranged processing areas 40, 41, 42, 43, 44, 45, with keywords 20, 21, 23, 24, 25, 26, 27, 28, 29, 30, 31 with only a certain selection of keywords being chosen at the decision positions 10, 11, 12, 13, for the sake of simplicity only for the introductory keywords 24, 26, 28, 30 of the processing areas 42, 43, 44 and 45 to reach the desired query result. A certain group of keywords forms each processing area, e.g. FROM (keywords 22, 23), WHERE (keywords 24, 25), GROUP BY (keywords 26, 27) etc., with each processing area carrying out an assigned set processing function, e.g. FROM forms Cartesian products, which enables special JOINs.

After each introductory keyword 20, 22, 24, 26, 28, 30 further keywords may follow which are not shown in FIG. 1 for the sake of clarity. Thus, after the keyword 24 "WHERE" the keywords "(", "NOT", a table name, a table space name, defined functions, etc. may follow directly, for example. A SUBSELECT, i.e. the recursive application of the RTN which always starts at SELECT (keyword 20), for example by "(", may always appear at a predetermined decision position. Therefore, at such positions only the entire RTN may always be recursively used as a unit.

Despite the plurality of potentially selectable keywords, SQL and related query languages are rather constrained and there is a variety of queries the transcription of which by the given processing areas in the predetermined processing order is quite complicated and tedious, which is why a more complex and slower access plan is generated from this description than actually needed.

Figure 2:
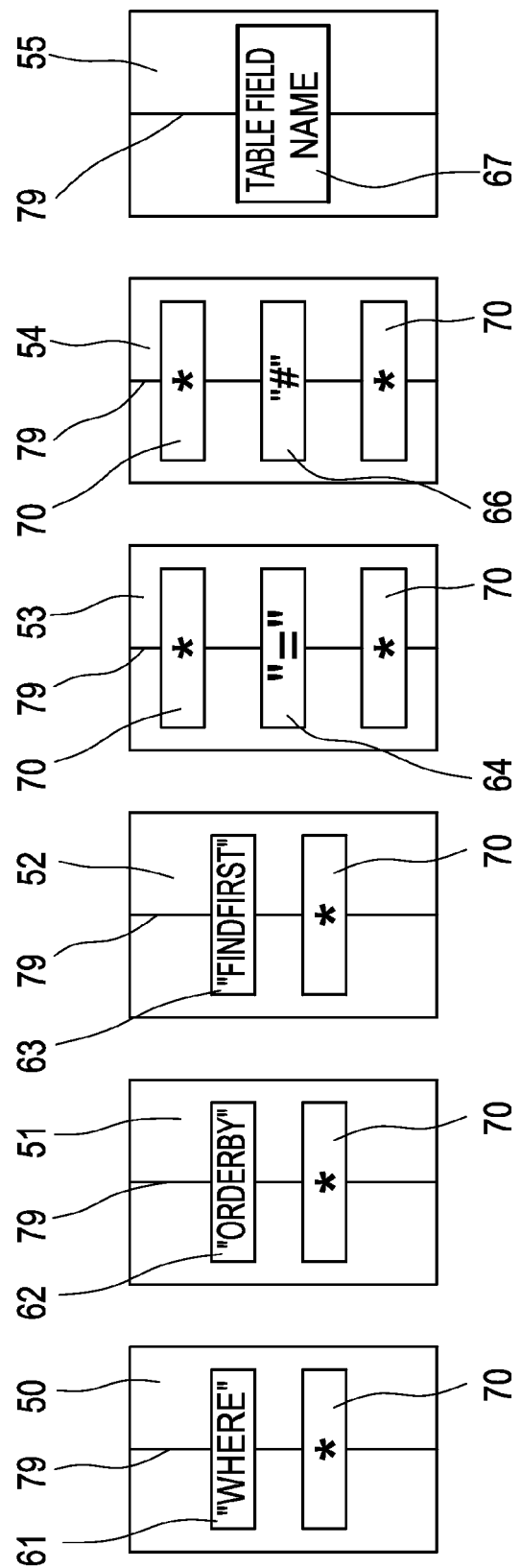
FIG. 2 is a schematic representation of the RTN building blocks which act as the basis for an embodiment of the inventive method.

FIG. 2 shows with an example a schematic representation of the RTN on which the inventive method is based, with the RTN being formed of independent RTN building blocks 50, 51, 52, 53, 54, 55 the number of which may be extended as desired. As an example FIG. 2 shows simplified RTN building blocks each of which have only one single decision path 79 with a corresponding low number of decision positions.

Each RTN building block 50, 51, 52, 53, 54, 55 accesses input data sets of an allocated processing input set with a defined order of the set elements, has these processed and provides a new processing output set with at least one output data set which also has a defined order of the set elements, with the output data sets not necessarily deviating from the input data sets with regard to their values. The processing in each case is based on keywords at the decision positions such as keyword 61 "WHERE", keyword 62 "ORDERBY", keyword 63 "FINDFIRST", keyword 64 "=", keyword 66 "#" and keyword 67, e.g. a table field name available in the relational database.

The decision positions 70 in the RTN building blocks 50, 51, 52, 53, 54, 55 marked with * perform a special function, namely that any RTN building block from the overall selection of all available RTN building blocks is introduced at this position and run through during the processing.

EXAMPLE 3

```
FROM COMPANIES
WHERE COMPANIES.CITY= "VIENNA"
ORDERBY COMPANIES.NO._OF_EMPLOYEES
FINDFIRST
  (COMPANIES.TURNOVER_PREVIOUS_YEAR>20,000)#100
```

FROM provides a data set which in the current example is the table COMPANIES.

WHERE (keyword 61 in RTN building block 50) takes all set elements of the input data set COMPANIES, with this processing function not influencing, both in the data input and the data output, the order and also not influencing the order as such. As is clear from FIG. 2, in the RTN building block 50 WHERE is to follow the decision position 70 which is marked with a "*", on which any RTN building block from all of the defined RTN building blocks is introduced and run through.

WHERE provides as an output data set, corresponding to the herein used definition for this RTN building block, from the input data set only those data records for which the RTN building block, being introduced on the decision position 70, yields after having run through in its delivered value set for each data record at least one value that is not 0 and not ZERO because each RTN building block outputs a set with at least one value.

It would be suitable to add, for example, a further optional decision position to the RTN building block or to define a separate building block in order to define that as selection criterion in the value set of the decision position 70 it is defined that at least one value must not be 0 and not ZERO or exactly may be not a value that is 0 or ZERO.

According to example 3 the RTN building block 53 is introduced at the decision position 70 at which for each case a further RTN building block is introduced on both of its decision positions 70 "*" (by using the RTN building blocks of FIG. 2).

In example 3 the RTN building block 50 delivers only those companies which read "Vienna" in the table field CITY.

ORDERBY (Keyword 62 in RTN Building Block 51)

The elements of the processing input set are sorted according to the value(s) resulting from the decision position 70 for each element and the RTN building block delivers as processing output set the elements of the processing input set in the appropriately sorted order. In example 3 the sorting takes place according to the number of employees.

FINDFIRST (Keyword 63 in RTN Building Block 52)

This RTN building block takes the input data set in sorted order as it is delivered, for example, by the ORDERBY RTN building block and by considering this order it finds only those elements and finds under consideration of this order only those elements for which the RTN building block, being introduced on the decision position 70, yields after having run through in its delivered value set for each element at least one value that is not 0 and not ZERO and outputs the found elements according to the input sorting order.

(Keyword 66 in the RTN Building Block 54)

In example 3 the RTN building block 52 ("FINDFIRST") is introduced in the RTN building block 54, which is a superordinated RTN building block, instead of the first decision position 70. The RTN building block 54 indicates in this definition that all elements which are delivered as resulting from the run of the first decision position 70 are limited to the number of elements that are stated at the second decision position 70.

The application of RTN building block 54 ("#") in its nested form in RTN building block 54 ("#") is acceptable by definition, as can be seen from example 4.

EXAMPLE 4

(5, 3, 2, 9) #3 #2

Resulting from step #3 the first three elements are taken, thus (5, 3, 2) delivered as output data set which is the input data set for #2. The result from #2 is (5, 3).

=(Keyword 64 in RTN Building Block 53)

In the current example in RTN building block 50 RTN building block 53 is introduced after keyword 61 (WHERE) at the decision position 70, thus WHERE *=*.

Table Field Name (Keyword 67 in RTN Building Block 55)

CITY, NO._OF_EMPLOYEES, TURNOVER_PREVIOUS_YEAR are table field names that can be at any decision position 70.

As already mentioned, each RTN building block (also in FIG. 2: 50, 51, 52, 53, 54, 55) has an inner, directed decision graph with at least one decision path 79. In the example according to FIG. 2 in each case exactly one decision path runs in each RTN building block 50, 51, 52, 53, 54, 55 without branches, with the decision graph from FIG. 2 being followed, starting from the top down to the bottom.

Each decision graph of the RTN building blocks 50, 51, 52, 53, 54, 55 is defined independently from the inner, directed decision graphs of the other RTN building blocks 50, 51, 52, 53, 54, 55 and may have one or more decision positions 70 along the decision path.

In the following, further possible RTN building blocks are described, which partly need more complicated decision graphs.

Figure 3:
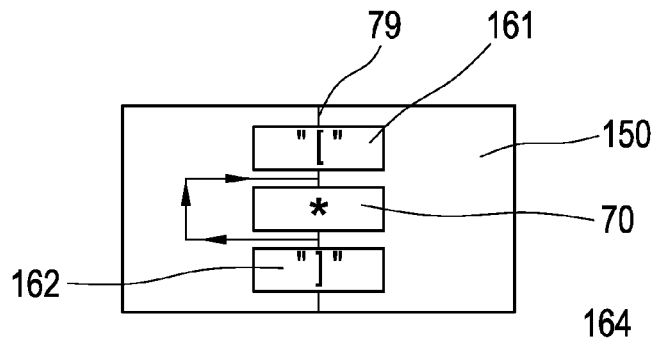
FIGS. 3, 4, 5 are each schematic representations of an RTN building block according to the method according to the invention.

FIG. 3 shows RTN building block 150 which, by means of a processing input set, delivers a processing output set having the characteristic that this processing output set is computed separately for each element of a superordinated set. At the decision position 70 any RTN building block may be introduced. By means of the described decision graph it is possible to have this position run successively as often as desired between the square brackets 161, 162 as indicated by the arrows, with one out of the overall selection of RTN building blocks being introduced in each run. A superordinated set in this context is the processing input set of the superordinated RTN building block in which this RTN building block is introduced at the decision position 70.

EXAMPLE 5

```
[
SELECT COMPANIES.COMPANY_NAME
WHERE [
  DEPARTMENTS.COUNT
  WHERE
  (COMPANIES.COMPANY_ID=DEPARTMENTS.COMPANY_#)
]>3
]
```

Here, it is provided for each company from the entire set of departments, as the set of all companies is the superordinated set, only those departments which are allocated to each company and counted. Only those companies are taken which have more than three departments.

The statement according to example 5 may be transformed into the following building blocks.

```
Application of RTN building block 150: [ * (repetition) ]
in this example yields [ * * ],
wherein
*  .........SELECT *¹
*  .........WHERE *¹
```

"Square brackets" according to this definition take the set included therein and the element of the processing input set which is being processed and the introduced RTN building blocks are run along the decision path of RTN building block 150, with this is being done according as often as there are elements of the processing input set. As this first RTN building block 150 has no superordinated RTN building block, a virtual processing input set with an element is assumed so that this first RTN building block is run through only once.

The processing input set of SELECT *¹ is COMPANIES because these are listed as a parameter of SELECT.

The processing input set of WHERE *¹ is COMPANIES because for reasons of compatibility with the SQL standard, display functions, as represented by SELECT, are always carried out at the end but can nevertheless be stated previously in the statement.

WHERE *¹ corresponds to RTN building block 50, with the decision position 70 expecting an RTN building block from the overall selection the value set of which is computed for each element of the processing input set, i.e. COMPANIES. At the decision position 70 in the current case (example 5) the following RTN building block is introduced:

*²(decision position 70)>(text)*²(decision position 70).

The first asterisk *² (decision position 70) reintroduces RTN building block 150 which in turn comprises [*³ *³], namely compound first asterisk *³=DEPARTMENTS.COUNT and WHERE (COMPANIES.COMPANY_ID=departments.COMPANY #) as compound second asterisk *³.

The second asterisk *² (decision position 70) following ">" contains a value set with one value, i.e. 3.

In the same manner as in example 5 the transformation into further RTN building blocks is continued.

In the following, there are shown two alternative notations for this example which describe the same problem as example 5 with different abstractions and which can be optimized in the same manner as example 5 and deliver an identical processing plan.

EXAMPLE 6

```
[SELECT COMPANIES.COMPANY_NAME
WHERE [
  DEPARTMENTS
  WHERE
  (COMPANIES.COMPANY_ID = departments.COMPANY_NO.)
].COUNT>3
]
```

In example 6 the set of departments for each company is run through and the elements that match are delivered according to current company as processing output set of RTN building block 150 and counted by "COUNT" and compared with >3.

EXAMPLE 7

```
[SELECT COMPANIES.COMPANY_NAME
WHERE [
  DEPARTMENTS.WHERE     (COMPANIES.COMPANY_ID  =
departments.COMPANY_NO.).COUNT
] > 3
]
```

In example 7 the set of departments for each company is run through and the number of elements that match is delivered according to the current company as processing output set of RTN building block 150 and compared with >3.

In order to further explain the definition of the square brackets another example is given which answers the same problem as in example 1, i.e. all companies from cities with more than 100 companies.

EXAMPLE 8

```
[SELECT COMPANIES.COMPANY_NAME, COMPANIES.ADDRESS
WHERE [ COMPANIES AS COMPANIES2
  WHERE COMPANIES.CITY = COMPANIES2.CITY
].COUNT > 100]
```

This example is characterized in that the set COMPANIES is accessed for each element COMPANY, which makes it possible to count identical cities.

In the following there are shown three alternative notations with different abstractions but identical optimized access plan.

EXAMPLE 9

[SELECT COMPANIES.COMPANY_NAME,
COMPANIES.ADDRESS
WHERE COMPANIES.CITY.[COMPANIES.COUNT] > 100]

Take all companies in the city of which more than 100 companies are found.

EXAMPLE 10

[SELECT COMPANIES.COMPANY_NAME,
COMPANIES.ADDRESS
GROUPBY COMPANIES.CITY
WHERE [COMPANIES.COUNT] > 100
END GROUPBY]

Combine companies.city for each different city by GROUPBY and memorize the companies of this city for each combined element. By [companies.count] count how many companies are allocated to each element city, and by WHERE only take those cities which are allocated more than 100 companies. END GROUPBY means that the combination for each city is being stopped and instead those companies are used which have been allocated to the city. As cities with less than 100 companies were not processed, also their companies were not processed any further.

EXAMPLE 11

[SELECT COMPANIES.COMPANY_NAME,
COMPANIES.ADDRESS
BREAKON COMPANIES.CITY
WHERE COUNT > 100]

The RTN building block "BREAKON *" provides for each element of its processing input set a dividing up into several output data sets in its processing output set, with the resulting output data sets being combined in the processing output set such that the elements of the processing input data set which redeliver the corresponding identical processing output set for the introduced RTN building block at the decision position 70 (*), each are introduced into the corresponding identical output data set and that the number of output data sets equals the number of the different values in the decision position 70 (*) of the RTN building block BREAKON.

In the current case (example 11) the decision position 70 for BREAKON is "COMPANIES.CITY", from which a number of data sets results which corresponds to the number of existing cities.

Other processing functions following BREAKON always relate to these output data sets as input data sets and independently apply their processing functions to each single input data set, and in turn provide the same number of output data sets until a certain RTN building block, for example, "END BREAKON" is reached, which indicates that all input data sets of its processing input set are combined into one single output data set in its processing output set.

For above example 11 all companies for each city are each written into a set of their own and the subsequent WHERE is independently applied to each of these sets, so as to count for each input data set city how many elements (companies) there are in the current input data set (city). If there are more than 100 companies in the current input data set city the entire input set for this city is taken on, and following this, all companies of this output data set are displayed with SELECT.

Another example firstly shows the application of a processing function on the entire data within a data set, followed by the dividing up into several data sets and then a processing function which is applied separately to each data set, followed by the combination into a data set by a last processing function which refers to the entire data set. Compared with SQL, both the formulation is shorter and follows the current problem more concretely as well as the processing is improved because the individual RTN building blocks describe very concretely what kind of result the user expects and one need not work with temporary tables.

EXAMPLE 12

[SELECT COMPANIES.COMPANY_NAME,    (0)
COMPANIES.ADDRESS
WHERE COMPANIES.DELETED = FALSE    (1)
BREAKON COMPANIES.CITY             (2)
WHERE COUNT > 100                  (3)
END BREAKON                        (4)
MAX COMPANIES.TURNOVER2006 # 1000  (5)
]

(1) From the entire set of companies only those companies are selected which are not deleted.
(2) Store the set of non-deleted companies according to identical city in corresponding identical data sets.
(3) Count each data set and continue using only those data sets, in which more than 100 elements are present. Now there are only those data sets, in this case cities, left, in which there are more than 100 companies.
(4) Rewriting all individual data sets into ONE data set means writing all companies of all cities with more than 100 companies into one data set.
(5) Among these companies choose only those which in their entirety belong to the 1000 companies with the best turnover.
(0) Delivery of the table fields defined in SELECT.

Figure 4:
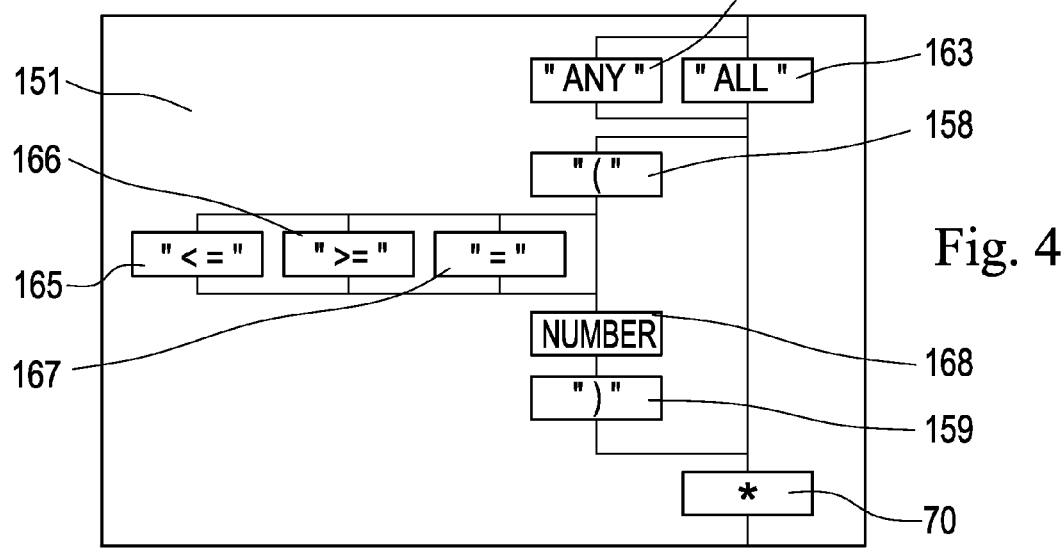

FIG. 4 shows RTN building block 151 with the keywords 163 "ALL" and 164 "ANY" which, as already previously indicated, are defined as selection criterion in the value set of the RTN building block that is introduced at the decision position 70 so that at least one value must be not 0 and not ZERO (ANY) or exactly no value may be 0 or ZERO (ALL).

RTN building block 151 also makes it possible to state that EXACTLY (keyword 167), AT LEAST (keyword 166) or A MAXIMUM OF (keyword 167) a certain set of values (keyword 168) must be not zero or ZERO (in the case of "ANY") or (in the case of "ALL") all values except for exactly (keyword 167)/at least (keyword 166)/a maximum of (keyword 165) must be a set (keyword 168) that is zero and ZERO, respectively.

The flexibility in the application of RTN building blocks may be shown by means of the previously described RTN building block 151 as follows. ANY, in its basic definition, means that at least one value of the set of values for the current element of the processing input set must match, thus be not zero and not ZERO. However, this function may be extended, if needed, by allowing a respective modification of one or several further superordinated or introduced RTN building blocks.

EXAMPLE 13

COMPANIES.WHERE ANY [CONTACT_PERSONS WHERE (COMPANIES.COMPANY_ID = CONTACT_PERSONS.COMPANY_NO.)].sex = "MALE"

ANY indicates that at least one value of the processing function—in example 13 at the position WHERE—must have at least one value that is not zero, thus delivers all companies where there is at least one male contact person.

EXAMPLE 14

COMPANIES.WHERE ANY (<=3) [CONTACT_PERSONS WHERE (COMPANIES.COMPANY_ID = CONTACT_PERSONS.COMPANY_NO.)].sex = "MALE"

ANY with the extension (<=3) means that a maximum of THREE values of the processing function—in example 14 at the position WHERE—must have at least one value that is not zero, thus provides all companies where THREE male contact persons at maximum are present.

EXAMPLE 15

COMPANIES.WHERE ALL [CONTACT_PERSONS WHERE (COMPANIES.COMPANY_ID = CONTACT_PERSONS.COMPANY_NO.)].sex = "MALE"

ALL means that all values of the processing function—in example 15 at the position WHERE—must not have a value that is exactly not zero, thus provides all companies where there are ONLY male contact persons.

EXAMPLE 16

COMPANIES.WHERE ALL (<=3) [CONTACT_PERSONS WHERE (COMPANIES.COMPANY_ID = CONTACT_PERSONS.COMPANY_NO.)].sex = "MALE"

ALL with the extension (<=3) means that all but a maximum of three values of the processing function—in example 16 at the position WHERE—may have a value that is not zero, thus provides all companies where THREE female contact persons at maximum are present.

Figure 5:
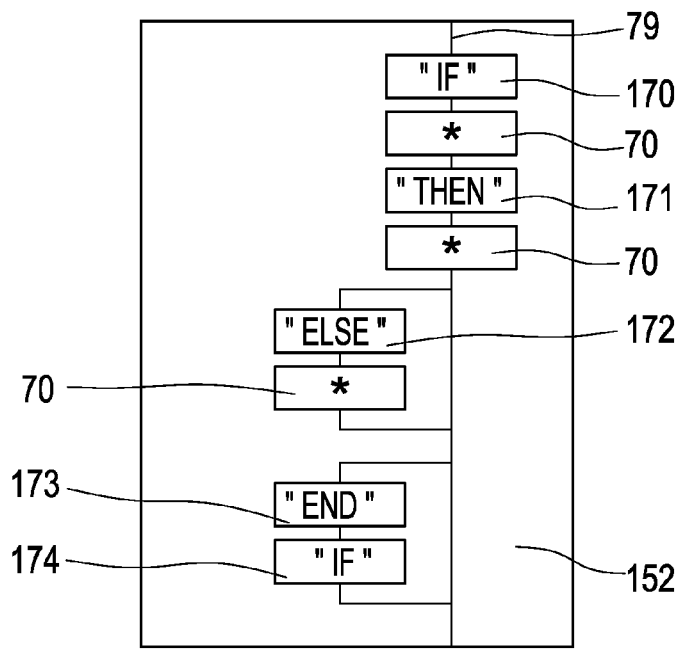

FIG. 5 shows RTN building block 152 which uses a IF THEN ELSE condition for the calculation of the output data set.

EXAMPLE 17

SELECT COMPANIES.COMPANY_NAME, COMPANIES.CITY
IF COMPANIES.NUMBER_OF_EMPLOYEES < 100
THEN WHERE COMPANIES.TURNOVER2006 >
    IF COMPANIES.ZIP = 1010 THEN 500,000 ELSE 300,000
ELSE MAX COMPANIES.TURNOVER_2006 # 1000
END IF
ORDERBY COMPANIES.COMPANY_NAME

The problem for this example is as follows. State all companies, with companies with less than 100 employees having other criteria compared with companies with exactly or more than 100 employees.

If the company has less than 100 employees the turnover 2006 is compared according to zip code (ZIP), but at ZIP 1010 the turnover must be >500,000 while all other ZIPs are compared with a turnover of 300,000.

Among companies with at least 100 employees only those companies are selected whose turnover in the year 2006 is amidst the 1000 biggest turnovers of all companies.

The RTN building block 152 in FIG. 5 has two necessary and one optional (after keyword 172) (ELSE) decision positions 70 at which an RTN building block from all RTN building blocks is introduced, with the keyword 170 (IF) and the subsequent decision position 70 determining whether this RTN building block returns for the current element of the processing input set either the decision position 70 after the keyword 171 (THEN) or the decision position 70 after the keyword 172 (ELSE) as processing output set of this RTN building block. If no keyword 172 (ELSE) and as a result no decision position 70 is stated, TRUE (−1) is assumed as processing output set for this decision position 70.

The keywords 173 (END) and 174 (IF) are therefore optional because the end of RTN building block 152 is defined by EXACTLY ONE decision position 70, while the keywords may be stated for reasons of clarity.

If several decision positions 70 are to be introduced subsequently between the keywords 170 and 171 or between the keywords 171 and 172 or between the keywords 172 and 173, respectively, there are two possibilities:

The first possibility would be to fixedly determine the keywords 173 (END) and 174 (IF) and as a result allowing calls that are repeatable any number of times at each decision position 70 of this RTN building block.

The herein chosen second possibility would be the use of an RTN building block which starts with at least one keyword and ends with at least one keyword and comprises between these keywords exactly one decision position 70 that is callable any number of times. In this RTN building block all desired RTN building blocks can be stated and the respective RTN building block can be introduced in RTN building block 152 as well as in all other RTN building blocks at the decision positions.

EXAMPLE 18

Figure 6:
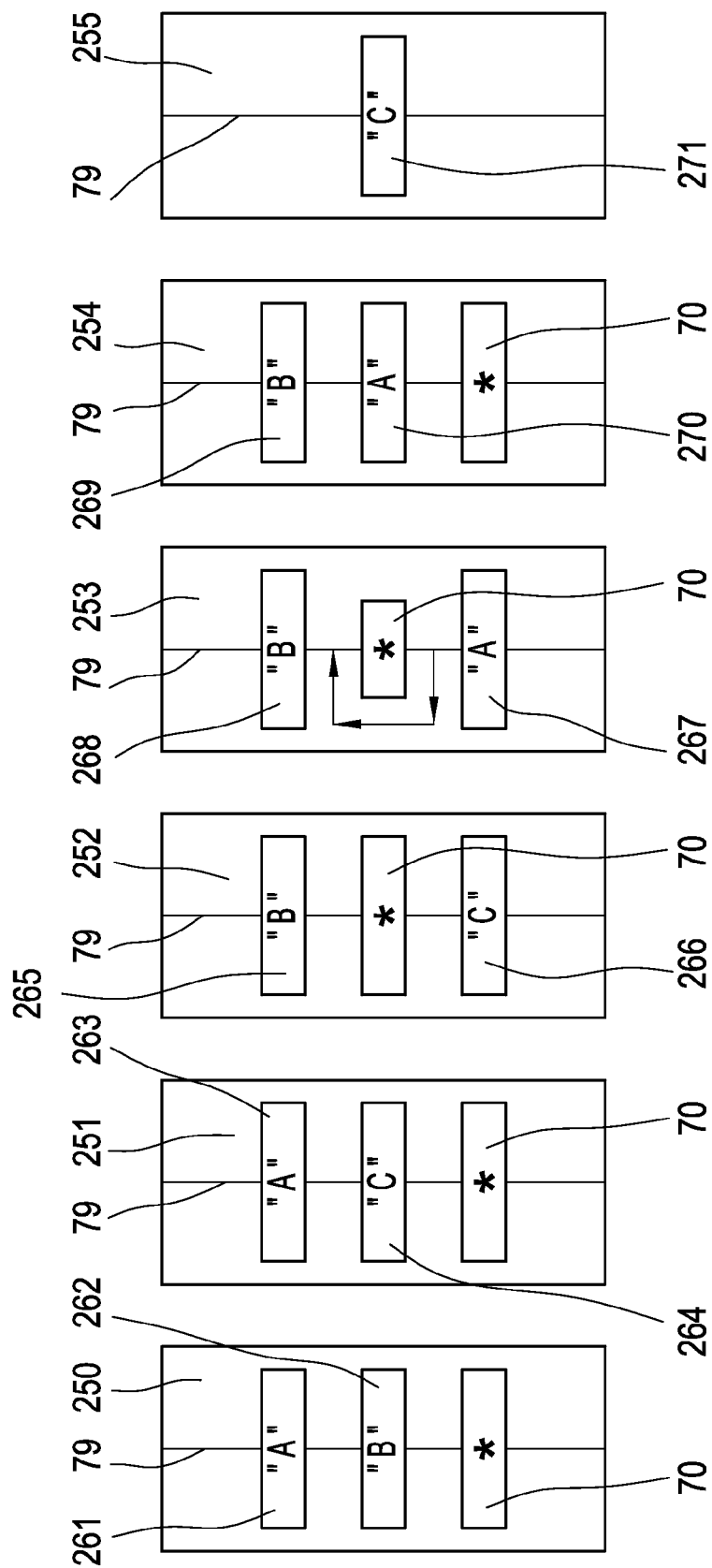
FIG. 6 is a schematic representation of the RTN building blocks which act as the basis for a further embodiment of the method according to the invention.

FIG. 6 shows, as an example, for reasons of simplicity an assumed, limited total of defined RTN building blocks 250, 251, 252, 253, 254, 255 next to each other.

The following statement comprising 10 keywords serves as basis for example 18, with A, B, C being the used keywords.
B A C C C B A C C A In a selection step according to the inventive method, the inner decision graphs of all RTN building blocks 250 to 255 are run through by means of the keywords 261 to 271, and all possible paths 79 of this decision graph are being followed until either no matches with the respectively chosen path 79 by the decision graphs is detected and the process is stopped or the respectively chosen path 79 is run through to the end.

Figure 7:
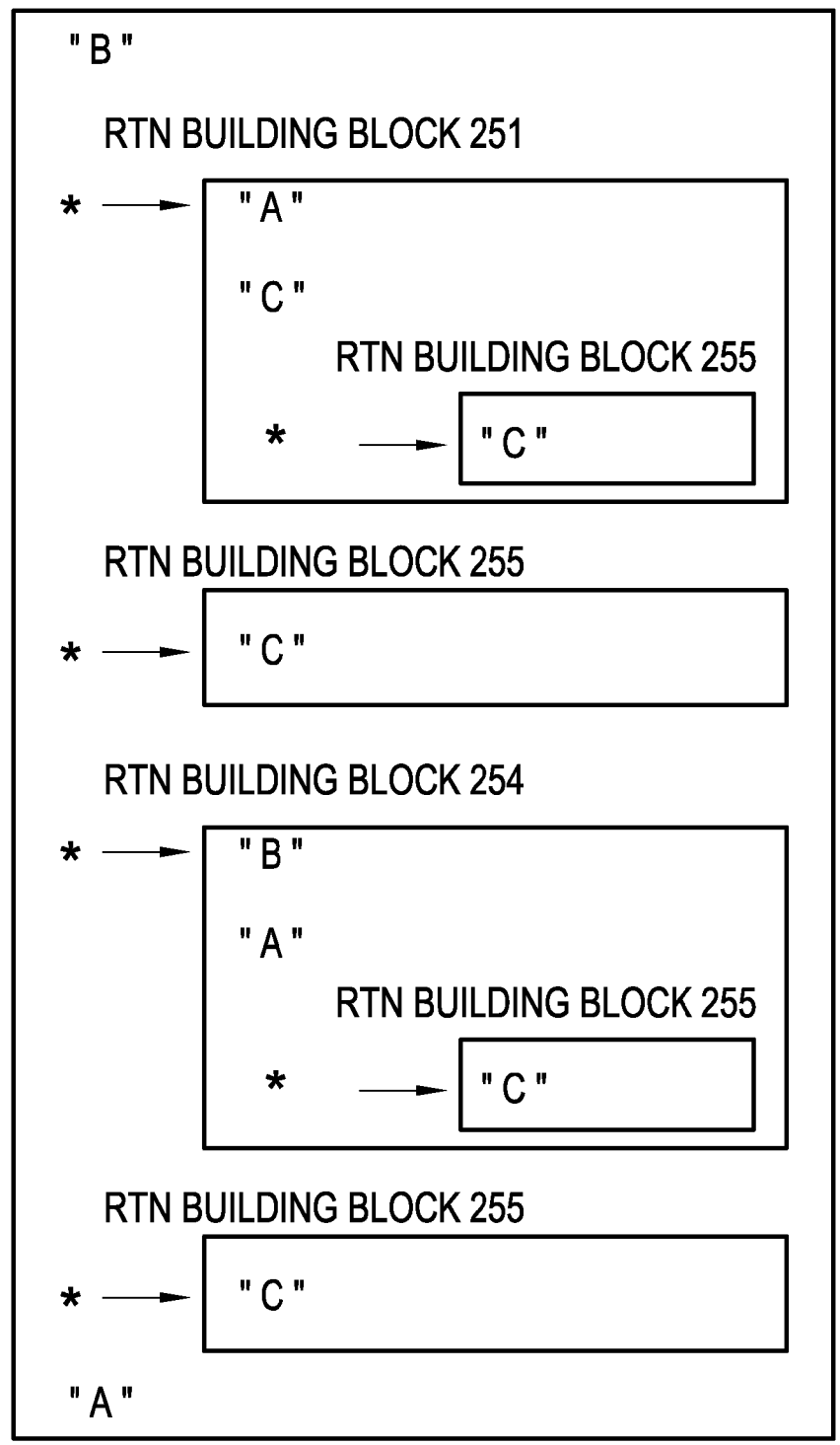
FIG. 7 is a schematic representation of the nesting of RTN building blocks according to an embodiment of the method according to the invention.

This process is comprised of the following ten steps, with the number of steps corresponding to the number of keywords, and is graphically illustrated in FIG. 7 as a result of the last 10 steps.

Step 1

"B" as the first keyword in the statement is compared with respective first keywords in the RTN building blocks 250, 251 . . . and a match found at RTN building block 250→no match at keyword 261 ("A")
RTN building block 251→no match at keyword 263 ("A")
RTN building block 252→keyword 265 ("B")
RTN building block 253→keyword 268 ("B")
RTN building block 254→keyword 269 ("B")
RTN building block 255→no match at keyword 271 ("C")

That is why only the RTN building blocks 252, 253, 254 are being followed.

| Results (current position being underlined) | |
|---|---|
| RTN building block 252 | B̲ * C |
| RTN building block 253 | B̲ * A |
| RTN building block 254 | B̲ A * |

Step 2

The next keyword—"A"—in the statement is used, with the match at the current second position of the respective RTN building block being searched. Decision position 70 ("*") in this context means that any RTN building block can be introduced at this position. The decision path therefore has a recursive call function at the decision position 70 by which one of the RTN building blocks is run through as the result of the application of the selection step on all RTN building blocks, so that a recursively nested execution of the selection step may be repeated as often as desired, starting from the at least one of the decision positions. Thus, it must also be examined at the decision position 70 whether it is possible to find a match by introducing one out of all RTN building blocks.

RTN building block 252→keyword 265 followed by decision position 70 ("B" "*")
RTN building block 253→keyword 268 followed by decision position 70 ("B" "*")
RTN building block 254→keyword 269 ("B" "A")

Therefore, at the decision position 70 in the RTN building block 252 one can select from all RTN building blocks to introduce one thereof. For example, the RTN building blocks 250 to 255 are introduced and examined whether they match with the statement, but a match at the first decision position can only be found for the RTN building block 250 and 251.

| | |
|---|---|
| 250 introduced in 252: | B * C → B A̲ B * C |
| 251 introduced in 252: | B *̲ C → B A̲ C * C |
| 250 introduced in 253: | B *̲ A → B A̲ B * A |
| 251 introduced in 253: | B * A → B A̲ C * A |
| 254 | B A̲ * |

Step 3

| | | |
|---|---|---|
| 250 introduced in 252: | B * C̲ → B A B̲ * C | not followed any further |
| 251 introduced in 252: | B * C̲ → B A C̲ * C | continue |
| 250 introduced in 253: | B * A̲ → B A B̲ * A | not followed any further |
| 251 introduced in 253: | B * A̲ → B A C̲ * A | continue |
| 254 | B A *̲ | introduction of all building blocks | results in:

| | |
|---|---|
| 251 introduced in 252: | B * C̲ → B A C̲ * C |
| 251 introduced in 253: | B * A̲ → B A C̲ * A |
| 255 introduced in 254: | B A *̲ → B A C̲ |

Step 4

| | | |
|---|---|---|
| 251 introduced in 252: | B A C *̲ C | introduction of all RTN building blocks |
| 251 introduced in 253: | B A C *̲ A | introduction of all RTN building blocks |
| 255 introduced in 254: | B A C | not followed any further as end is reached | results in:

| | |
|---|---|
| 255 in 251 introduced in 252: | B * C → B A C C̲ C |
| 255 in 251 introduced in 253: | B * A → B A C C̲ A |

Step 5

| | | |
|---|---|---|
| 255 in 251 introduced in 252: | B A C C C̲ | continue |
| 255 in 251 introduced in 253: | B A C C *̲ A | any kind of reaching the decision position 70 in RTN building block 253 possible; |
| 255 in 251 introduced in 253 | B A C C A̲ | not followed any further, as there was no match | results in
| | |
|---|---|
| 255 in 251 introduced in 252 | B A C C C̲ |
| (255 in 251, followed by 255) introduced in 253 | B A C C C̲ A |

Step 6

| | | |
|---|---|---|
| 255 in 251 introduced in 252: | B A C C C | not followed any further as end is reached |
| (255 in 251, followed by 255) introduced in 253 | B A C C C A̲ | not followed any further, as there was no match |
| (255 in 251, followed by 255) introduced in 253 | B A C C *̲ A | introduction of all RTN building blocks | results in:
| | |
|---|---|
| (255 in 251, followed by 255, followed by 252) introduced in 253 | B A C C C B̲ * A A |
| (255 in 251, followed by 255, followed by 253) introduced in 253 | B A C C C B̲ * A A |

-continued (255 in 251, followed by 255, B A C C C B̲ A * A
followed by 254)
introduced in 253
and so on . . .

Result of Step 10

(255 in 251, followed by 255, followed by 255 in 254, followed by 255) in 253

From the result shown in FIG. 7 according to step 10 there is generated an access plan for the relational database system according to the order of the RTN building blocks and their nesting as results from the execution of the selection steps on all keywords of the query statement, with the nesting of the RTN building blocks optionally having to be changed by means of the below explained weighting in order to properly solve ambiguities which result from the introduction possibilities of RTN building blocks at the decision positions 70 of other RTN building blocks.

So as to always clearly note the end of each RTN building block and the RTN building blocks introduced therein, it is necessary that at least one decision position which demands a keyword (text, symbol, variable or numeral) is prefixed to the decision graphs of the RTN building blocks at those decision positions at which an unlimited number of consecutive calls of recursive call functions which cannot be determined in advance is carried out, and that at least one decision position that also demands a keyword follows this.

An example thereof is the RTN building block "levels", in which the decision position 70 can follow consecutively as often as desired, with this building block by definition starting with a previous keyword ("[") and ending with a subsequent keyword ("]"): "[" (1)*(*1)1].

By means of the inventive method with its degrees of freedom in the formulation of statements it becomes possible to define a query language which follows the logic below:

There is assumed a plurality of tables and stored queries in a relational database system which in the following are termed as sets and are abstracted.

According to the invention a plurality of predetermined RTN building blocks is given, with each RTN building block having an inner decision graph which is defined independently from the inner decision graphs of the other RTN building blocks. A plurality of the RTN building blocks has at least at one decision position a syntactic mark which indicates that at this decision position any desired RTN building block from all RTN building blocks can be introduced. In the one previously shown this corresponds to the decision position 70.

Each RTN building block is allocated at least one processing input set, carries out at least one processing function based on this processing input set and forms a processing output set. By doing so, it is intended that the processing input sets of an RTN building block can be newly allocated by an RTN building block which is introduced at decision graphs 70 in this RTN building block prior to the execution of the processing function.

By the transforming and introducing into RTN building blocks, each formulatable statement is brought into the same abstraction form which is based on a nesting of RTN building blocks, independent of the processing function which is allocated to the RTN building blocks in use. By this identical abstraction one algebra satisfies all RTN building blocks and nesting possibilities.

A finite number of basic building block groups can always be declared, with several assumptions being required which apply unless superordinated or introduced RTN building blocks specify a different definition of their own.

Figure 14:
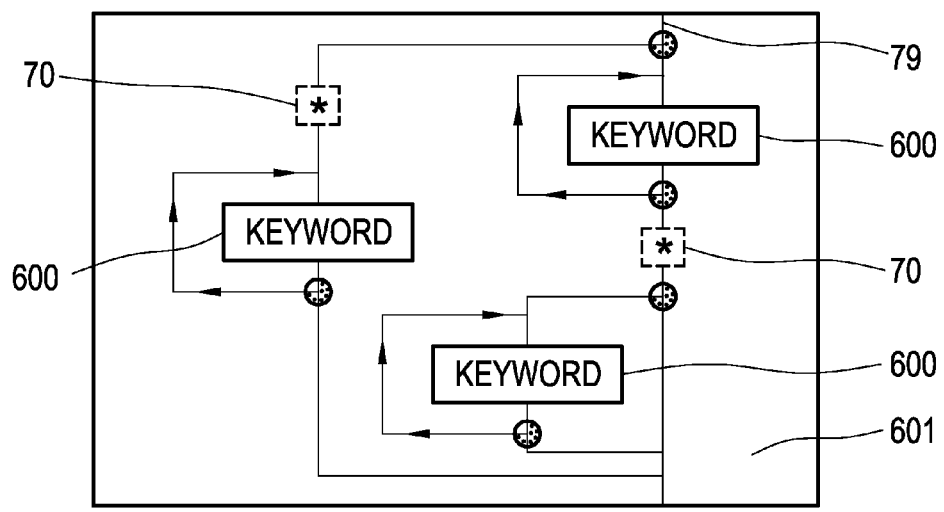
FIGS. 14, 15, 16, 17 are each schematic representations of group variants of RTN building blocks, as applied in embodiments of the method according to the invention.

Examples for possible basic building block groups (FIG. 14, 15, 16, 17)

Variant 1 (FIG. 14): RTN building block 601 with any keyword 600 and exactly one decision position 70, in which an RTN building block from all RTN building blocks is introduced, with one RTN building block of this variant specifying at least one keyword 600 either BEFORE and/or AFTER the decision position 70.

Variant 2 (FIG. 15): RTN building block 602 with any keyword 600 and at least two or more decision positions 70, with all present decision positions 70 each being separated by keywords.

Variant 3 (FIG. 16): RTN building block 603 with any keyword 600 which is located exclusively BEFORE or AFTER the decision position 70 which can be called as often as desired.

Variant 4 (FIG. 17): RTN building block 604 with any keyword 600 which is located at the beginning and the end of the decision path 79 and which comprises a decision position 70, followed by a decision position 70 that can be called as often as desired, with any number of keywords 600 being able to follow after the first decision position 70.

All nesting possibilities resulting from the formulation of any statement may be divided up into these or further variants or their combinations. There are shown processing steps which are respectively applied in these variants as long as the used RTN building blocks do not describe other processing methods and processing set allocations, respectively.

Figure 8:
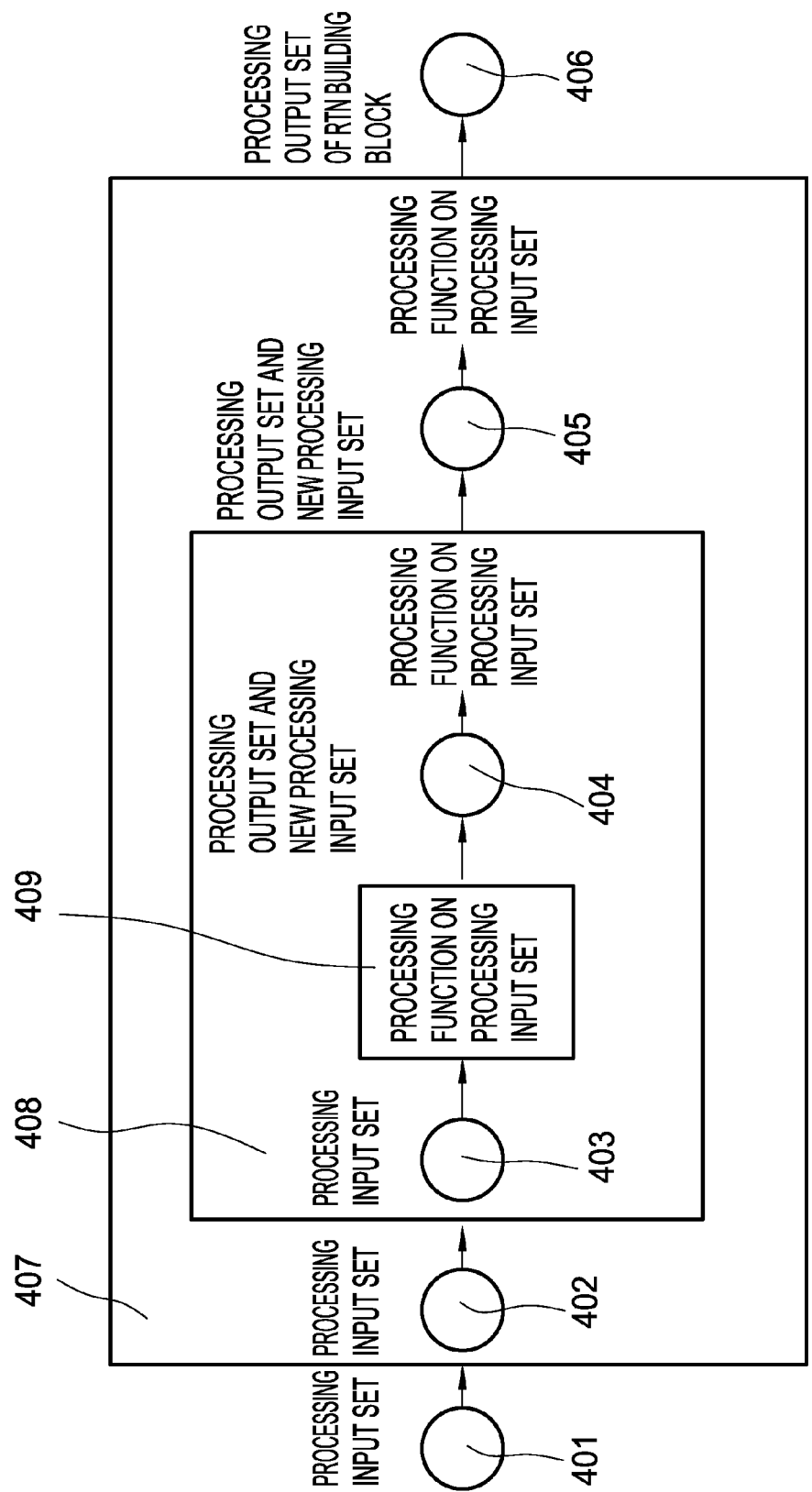

Variant 1 (FIGS. 8, 14)

For those RTN building blocks of all RTN building blocks which are defined according to the variant 1 shown in FIG. 14, the following processing set allocation applies:

If a decision position 70 is provided in a superordinated RTN building block, the additional RTN building block which is introduced at this position as processing input set, is allocated the processing input set which had been allocated to the superordinated RTN building block. This process is carried out up to the inner-most nested RTN building block so that the processing input set is always transferred to the directly introduced respective RTN building block at the decision position 70. Unless no other RTN building blocks are introduced in the introduced RTN building block, the processing function of the introduced RTN building block is then applied to its allocated processing input set, and the resulting delivered processing output set of the introduced RTN building block is allocated to the superordinated RTN building block as new processing input set, following which the processing function of the superordinated RTN building block is carried out. The result of this application is delivered as processing output set of the superordinated RTN building block. Therefore, this principle allows the nesting of RTN building blocks as often desired.

Thus, FIG. 8 shows the nested RTN building blocks 407, 408, 409 according to

---

RTN building block 407 (keyword + decision position 70)
RTN building block 408 (keyword + decision position 70)
RTN building block 409 (keyword)

---

Processing input set 401 is transferred to RTN building block 407 and then transferred to the introduced RTN building block 408 as its processing input set 402, which, in turn, is identically passed on to the RTN building block 409 that is introduced in the RTN building block 408.

Once the inner-most nesting point is reached, the processing function of the RTN building block 409 is applied to the processing input set 403, and the result transferred as processing output set 404 to RTN building block 408 as the new processing input set.

Now the processing function of RTN building block 408 is applied to the new processing input set 401, with the result being transferred as processing output set 405 and as the new processing input set to RTN building block 407.

In the next step the processing function of the next, outer RTN building block, i.e. RTN building block 407, is applied to its new processing input set 405, and the result stored in the processing output set 406 of RTN building block 407.

A differing definition for individual RTN building blocks, however, cannot be excluded, as is already mentioned above.

Figure 9:
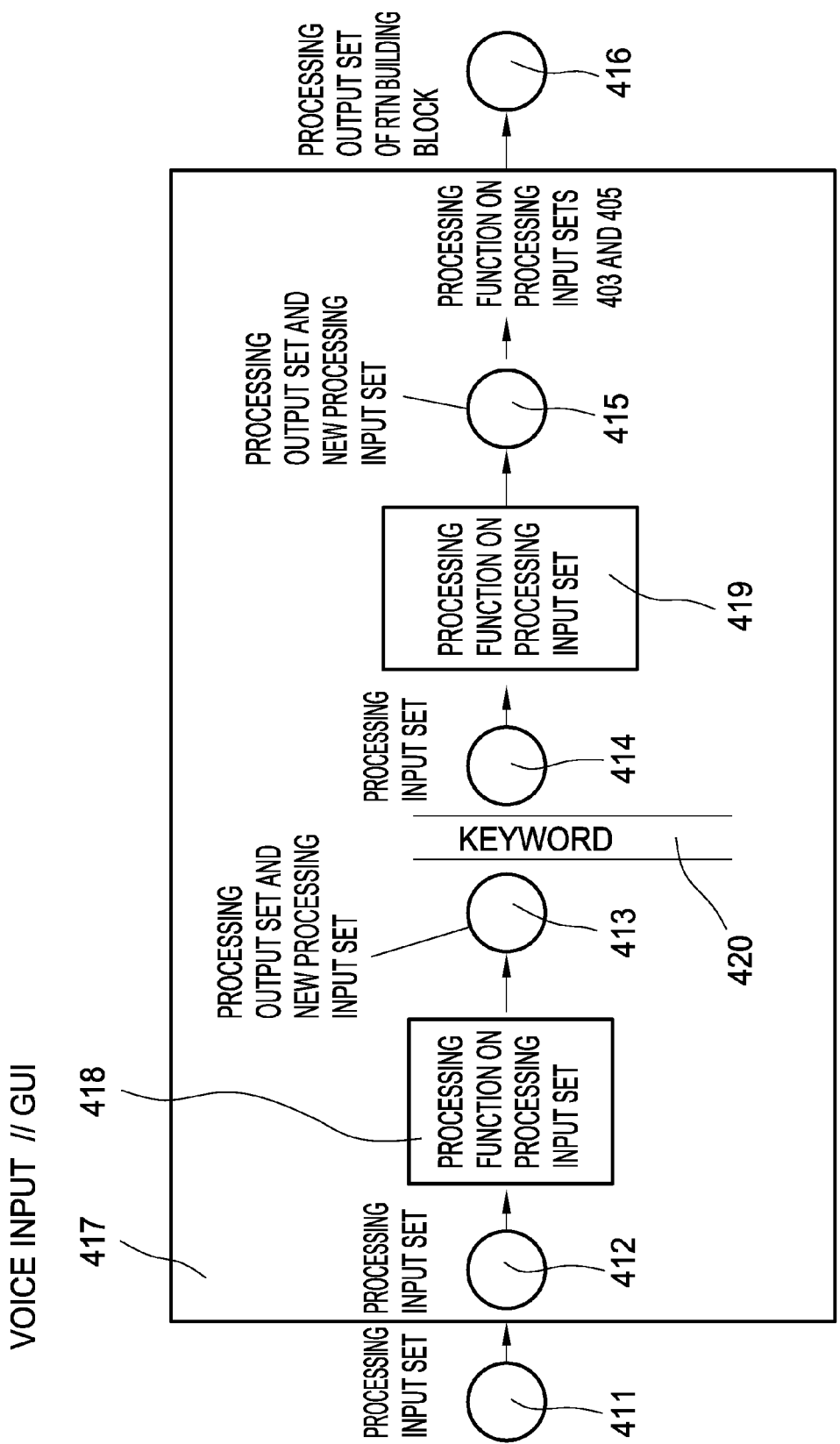
Figure 15:
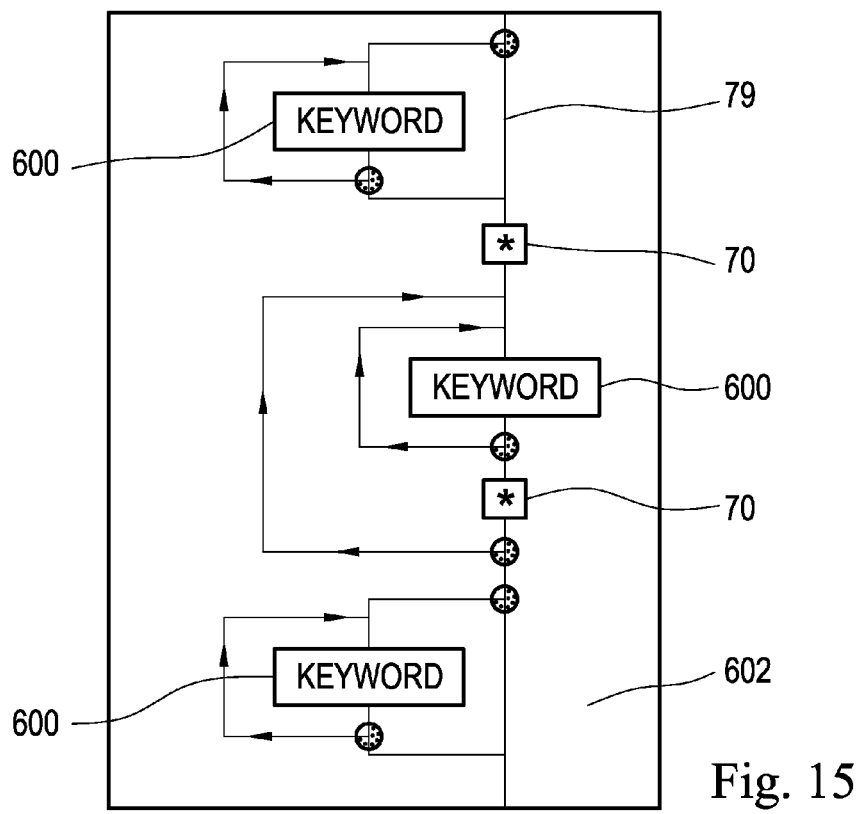

Variant 2 (FIGS. 9, 15)

For those RTN building blocks of all RTN building blocks that are defined according to variant 2 shown in FIG. 15, the following allocation for processing sets applies: If in each case at least one keyword is present between two or more decision positions 70 in a superordinated RTN building block, each time the same processing input set, i.e. the processing input set of the superordinated RTN building block, is allocated to the RTN building blocks that are introduced directly at the decision position 70, with all resulting processing output sets being transferred as processing input sets of the processing function of the subordinate RTN building block, unless in special cases the outer and/or at least one of the introduced RTN building blocks uses a different definition.

FIG. 9 shows the RTN building blocks 418 and 419 linked by a keyword 420 that are introduced in an RTN building block 417. This variant is applied, for example, in arithmetic or logic operations of RTN building blocks.

| RTN building block 417 (decision position 70 + keyword 420 + decision position 70) | |
|---|---|
| RTN building block 418 | RTN building block 419 |

The processing input set 411 is transferred to a superordinated RTN building block 417 and then handed over to the introduced RTN building block 418 as its processing input set 412. The associated processing function of the RTN building block 418 is then applied to the processing input set 412 and stored in the processing output set 413.

The RTN building block 419 also receives the processing input set 411 of its superordinated RTN building block 417 as processing input set 414. The associated processing function of the RTN building block 419 is then applied to its processing input set 414 and stored in the processing output set 415.

In the next step the subordinate RTN building block 417 is allocated the processing output sets 413 and 415 as its two new processing input sets, on which its processing function is from then on applied and subsequently stored in the one processing output set 416.

A differing definition for individual RTN building blocks, however, cannot be excluded, as is already mentioned above.

Figure 10:
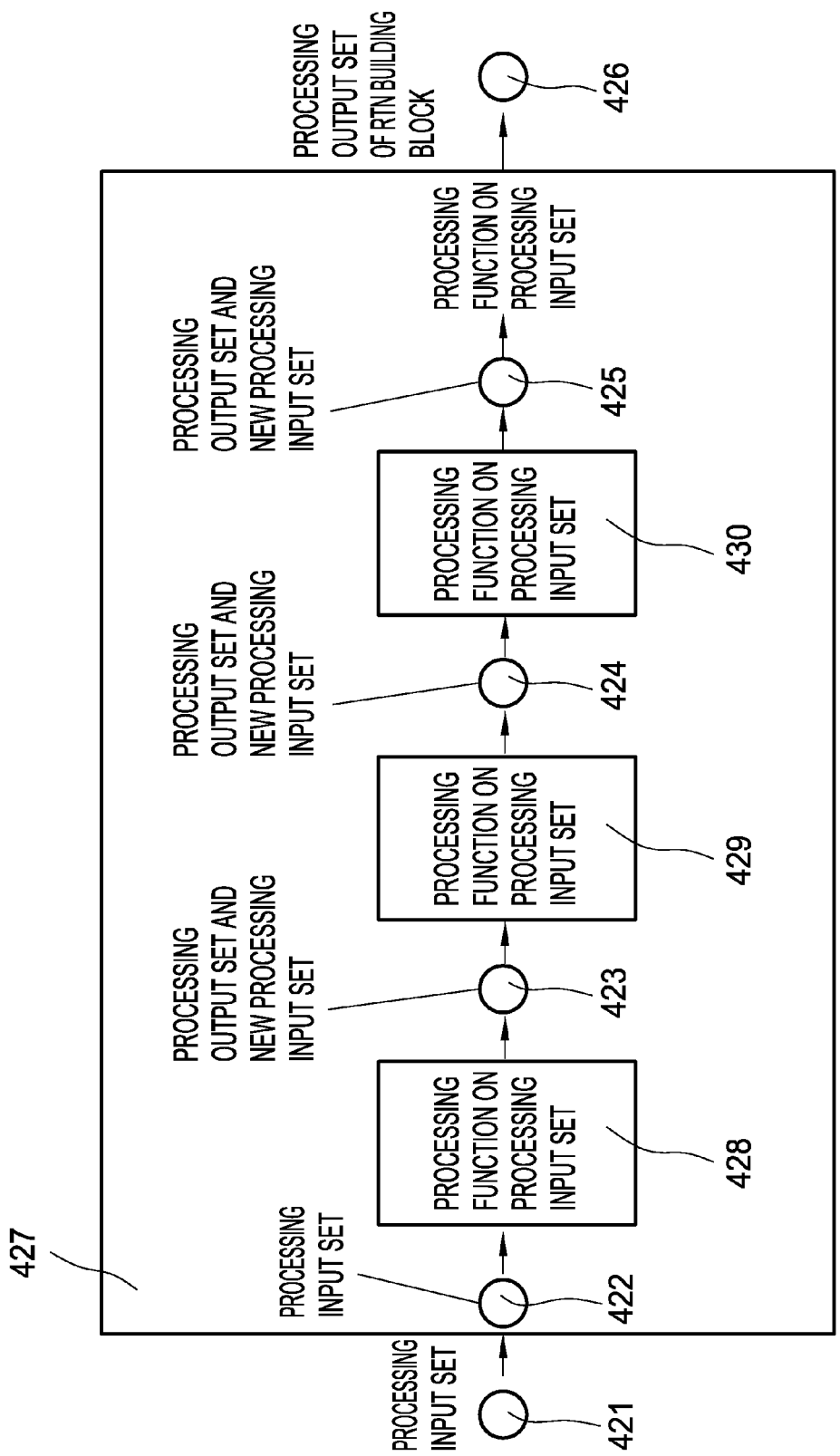
Figure 16:
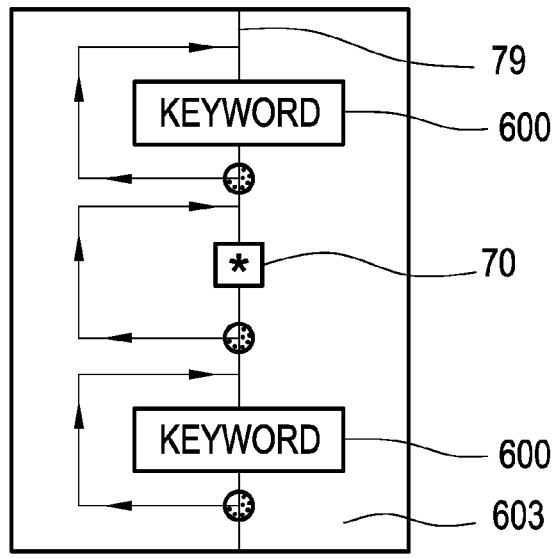

Variant 3 (FIGS. 10, 16)

For each RTN building block of all RTN building blocks that are defined according to variant 3 shown in FIG. 16, the following allocation for processing sets applies: The superordinated RTN building block has a decision path which makes it possible that the decision position 70 is reached consecutively as often as desired (see RTN 253 in FIG. 6).

For this case it applies that the RTN building block which is introduced at the first position of the order retrieves the processing input set of the superordinated RTN building block, other consecutive RTN building blocks each use the processing output set of the precursor as processing input set and the RTN building block that is last in the order hands over its processing output set as processing input set to the superordinated RTN building block which carries out its processing function, unless in special cases the outer or at least one of the introduced RTN building blocks uses a different definition. By doing so, as compared with SQL a substantially more free execution of queries is made possible, as already mentioned elsewhere.

FIG. 10 shows the RTN building blocks 428, 429, 430 that follow each other in a superordinated RTN building block 427 where, with the exception of the first and last RTN building block, in the given order of the RTN building blocks each processing output set of the previous RTN building block is retrieved as processing input set of the subsequent RTN building block, and the processing function that is allocated to the respective RTN building block is applied.

Specifically, a processing input set 421 of the subordinate RTN building block 427 is transferred as processing input set 422 of the RTN building block 428 that comes first in the order and its processing function applied thereon, resulting in a processing output set 423. The latter is passed on as processing input set 423 of the second RTN building block 429. In a similar way this happens to the subsequent RTN building block 430 and its resulting processing input set 424 the processing output set 425 of which is retrieved as new processing input set on which the processing function of the subordinate RTN building block 427 is applied, which results in the delivery of a processing output set 426.

Figure 12:
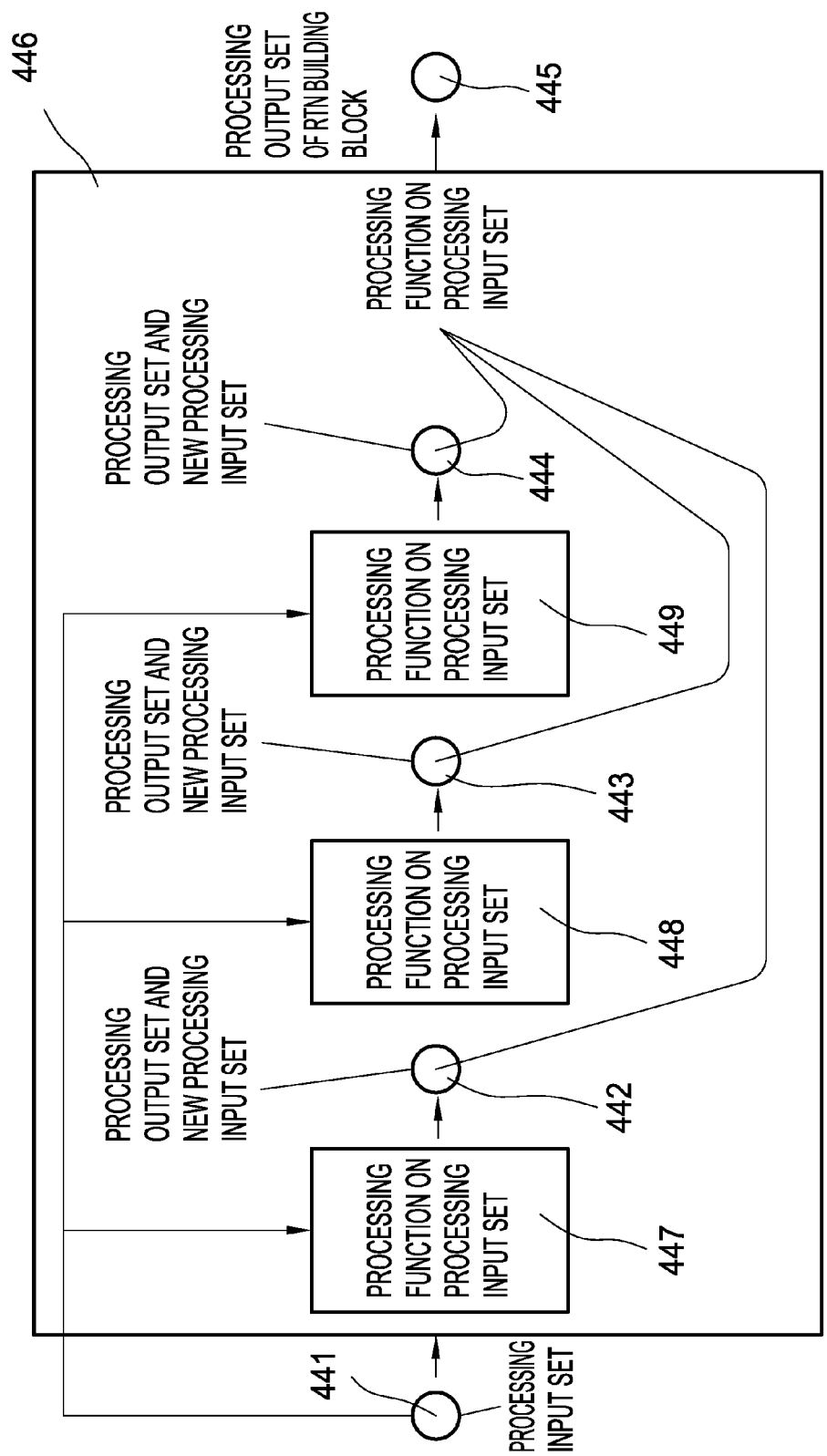

A useful possible redefinition of the variant 3 is given by the RTN building block 446 with the following set allocation properties and is shown in FIG. 12.

The superordinated RTN building block 446, however, has a decision path which enables that the decision position 70 can be reached consecutively as often as desired.

According to the definition of the special RTN building block 446 it applies that all RTN building blocks 447, 448, 449 which are introduced directly at the decision positions 70 are allocated the processing input set 441 of the superordinated RTN building block 446.

As processing input set of the superordinated RTN building block 446 the processing output sets 442, 443, 444 of all directly introduced RTN building blocks 447, 447, 449 are taken and stored in the processing output set 445 after applying the processing function.

Examples of the possible processing functions of this RTN building block 446, determined, for example, by own RTN building blocks:

1. All elements that have a certain number (at least, exactly, maximum, . . . ) of all processing output sets of the introduced RTN building blocks (ANY (*)).
2. All elements that are in each processing output set of the introduced RTN building blocks and in all processing output sets, respectively, with the exception of at least/a maximum of/exactly a certain number (ALL (*)).

By means of a separate RTN building block it can also be stated whether elements that are present in more than one processing output set of the introduced RTN building blocks should be taken on in the processing output set of the superordinated RTN building block once or several times.

If there are no RTN building blocks given as parameters for the processing function of this superordinated RTN building block 446, it is assumed that all elements which are present at least in one of the processing output sets 442, 443, 444 of the introduced RTN building blocks 447, 448, 449 should be delivered without duplicates.

Figure 13:
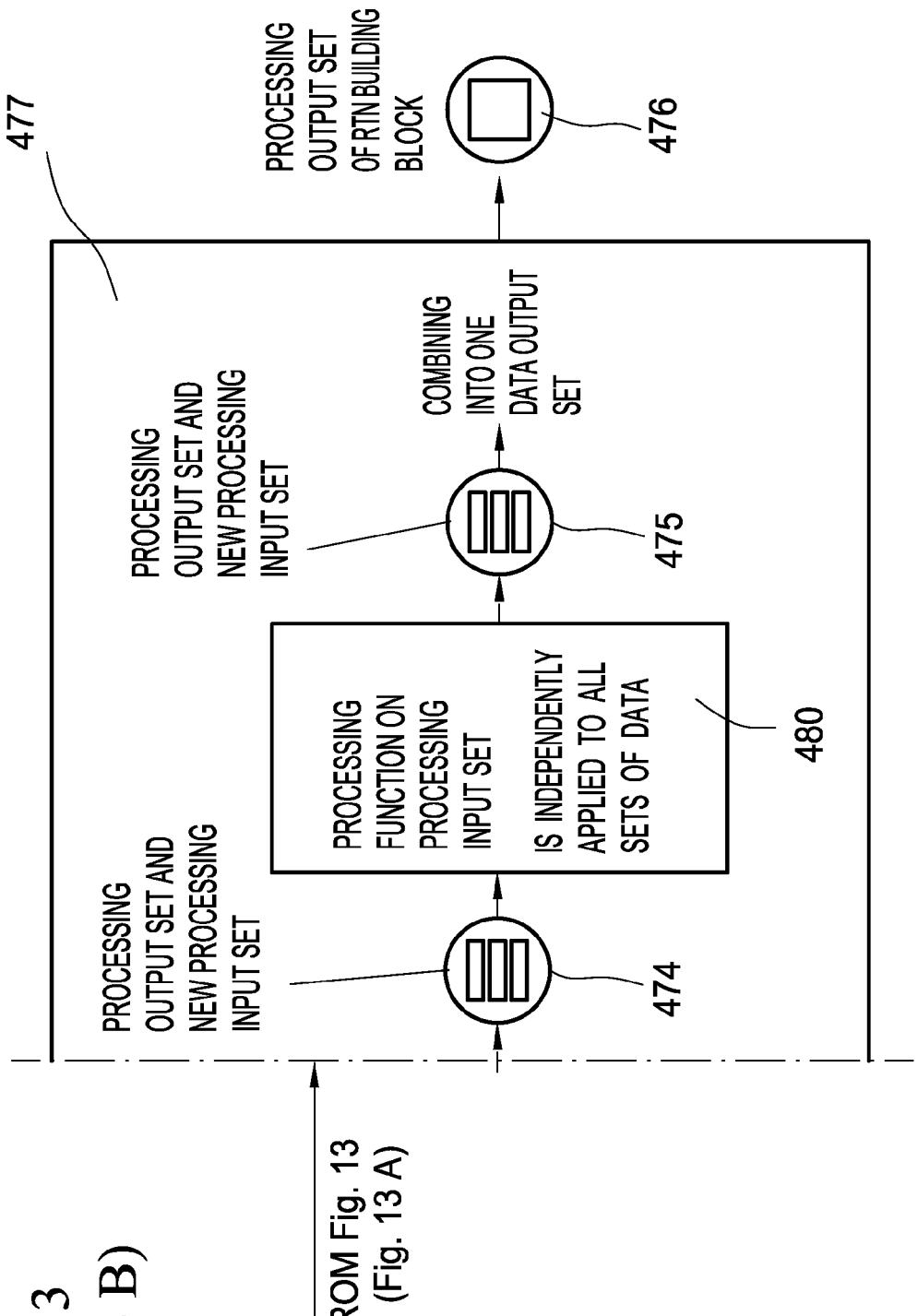
Figure 17:
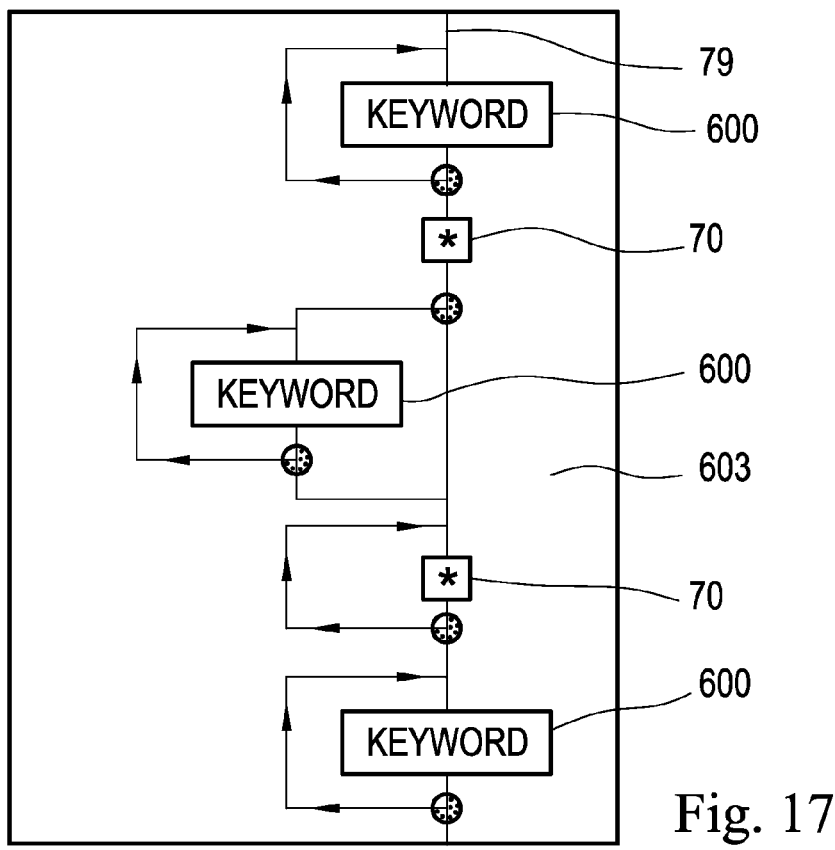

Variant 4 (FIGS. 11, 13, 17)

For those RTN building blocks of all RTN building blocks that are defined according to variant 4 shown in FIG. 17, the following allocation for processing sets applies:

The superordinated RTN building block (e.g. RTN building block 457 in FIG. 11 or RTN building block 477 in FIG. 13) has a decision path which specifies a decision position 70 after one or more keywords 600, after which any number of keywords 600 can follow and which makes it possible that the decision position 70 is reached consecutively as often as desired (see RTN 253 in FIG. 6), with this being ended by at least a keyword 600.

To RTN building blocks of this variant it applies that the first decision position 70 uses the data of the processing input set of the subordinate RTN building block and by means of the processing output set of the introduced RTN building block at the decision position 70 the processing function of this RTN building block is carried out, while for all other RTN building blocks that are introduced at the decision position 70, which can be called as often as desired, it applies to the set allocation the logic described for variant 3 (FIG. 16), with the first RTN building block of the decision position 70, which can be called as often as desired, being allocated the processing output set of the RTN building block at the first, not repeatable decision position as its processing input set. Once the end of the subordinate RTN building block which is marked with at least a keyword 600, is reached, at least a further processing function can be applied to the processing output set of the last RTN building block of the decision position 70 which can be called as often as desired.

In FIG. 11 an RTN building block of the variant 4 is shown which has introduced at the first decision position 70 of the subordinate RTN building block 457 the RTN building block 458 which accesses the processing input set 452 of the superordinated RTN building block 457, with the processing input set 452 corresponding to the processing input set 451.

The processing function of this RTN building block 457 firstly carries out a grouping according to identical value sets of the processing output set 453 of the RTN building block 458 for the elements of the processing input set 452 with reference to the respective grouped elements. In this way, the processing input set 451 that is passed on as processing input set 452, contains 17 elements. As a result of the processing function of the RTN building block 458, in the processing output set 453 these are grouped into five different elements, with each element referring to a respective set by the individual elements which were combined (set 461, 462, 463, 464, 465). The processing output set 453 is now the processing input set for the RTN building block 459. If elements are removed by the subsequent processing functions of the introduced RTN building blocks 459 and 460 from the respective processing output set 454, 455, the reference to the sets of the allocated elements (in FIG. 11 set 461 and 463) is also omitted. When completing this RTN building block it is defined that all elements of the allocated sets (sets 462, 464, 465) of the processing output set 465 in the processing output 456 of the RTN building block 457 are written into the processing output set 456 of the RTN building block 457. This last processing function is only carried out if it is explicitly called via at least an optional keyword in the RTN building block 457 or by a subsequent RTN building block.

In FIG. 13 an RTN building block of the variant 4 is shown, having introduced at the first decision position 70 of the superordinated RTN building block 477 the RTN building block 478 which accesses the processing input set 472 of the superordinated RTN building block 477, with the processing input set 472 corresponding to the processing input set 471.

The processing function of this RTN building block 477 firstly carries out a grouping according to identical value sets of the processing output set 473 of the RTN building block 478 for the elements of the processing input set 472, with elements having each to be grouped identically being written independently into the same output data sets of the processing output set 473.

Due to the presence of this RTN building block 477 it is assumed that each processing input set and each processing output set contains at least one input data set and at least one output data set, respectively, with the number, content and order within the data sets of the processing input sets and processing output sets not having to be identical. If no input data sets and no output data sets, respectively, are described, each processing input set and each processing output set contains exactly one input and output data set, respectively, which includes all elements. All processing functions are independently applied to all input data sets of the processing input sets (in FIG. 13: 473, 474) of the respective RTN building blocks (in FIG. 13: 479, 480) and correspondingly written into the output data sets of the processing output sets 474, 475 of the respective RTN building blocks 479, 480, with the provision that the output data sets still include elements. When completing this RTN building block it is defined that all output data sets of the processing output set 475 are written into the same output data set of the processing output set 476 of the RTN building block 477. This last processing function is only carried out if it is explicitly called via at least an optional keyword in the RTN building block 477 or by a subsequent RTN building block.

By referring to FIG. 13 it becomes clear that each processing function of an RTN building block refers to its processing input set and is always independently carried out on all elements of all input data sets in its processing input set, and stored in identical and other output data sets, respectively, of its processing output set, unless an RTN building block indicates a different definition.

The RTN building blocks are allocated processing input sets. Thus, RTN building blocks can be provided which individually describe the allocation of the processing input sets to the RTN building blocks.

A further possible characterization of the RTN building blocks can be carried out as follows and is stated as an example that there are no limitations also with regard to this characterization. Moreover, it is clearly evident that there are approaches with regard to the processing by an engine.

It must be possible to both address Cartesian products as one set (RTN building block "FROM") and in each case go to an overall second set per element and by doing so, also reach a Cartesian product, with the values in this case being calculated and delivered (RTN building block "levels") according to each element of the first set depending on the criteria of the second set.

RTN Building Block "FROM"

"FROM" forms a Cartesian product for the resulting set of the RTN building block which is indicated at the decision position 70 of this RTN building block and makes it available as processing input set for the RTN building block at the first decision position 70 in its superordinated RTN building block "levels".

RTN Building Block "Levels"

"Levels" carries out all processing functions of those RTN building blocks that were stated subsequently in this RTN building block ("levels") at the decision positions 70 step by step according to each element of the processing input set of the RTN building block where this RTN building block ("levels") is contained, with the processing input set of each RTN building block being the processing output set of the RTN building block right before. The specificity of this RTN building block of variant 3 is that this RTN building block does not pass on its processing input set as processing input set for the first RTN building block introduced therein, but that the processing input set for the first RTN building block is defined by means of an RTN building block of its own (e.g. processing output set of an RTN building block "FROM") or from the sum of all sets and tables, respectively, used in this RTN building block.

The RTN building block which is introduced in this RTN building block "levels" at the first decision position 70 takes as processing input set a set (table, stored query or Cartesian product) which is defined in the RTN building block "levels" as processing input set by the processing output set of a particular RTN building block (e.g. "FROM"). If no processing input set for the introduced RTN building blocks is defined in the RTN building block "levels", this processing input set can be determined by data-specific properties, e.g. by the theory of graphs, the table of relations and all stated RTN building blocks "tables" in this RTN building block "levels", independently from the nesting in the RTN building block "levels".

Since there is no surrounding RTN building block in the outermost RTN building block "levels" into which it could be introduced and the processing input set of which could be taken, an abstract query set with an element is taken, with the element containing, in an abstract way, all numbers, constants, letters and global functions, etc.

Each RTN building block "levels" provides itself and all RTN building blocks that are nested therein with the respective current element with all pieces of information (e.g. all table fields) of its processing input set, delivered by the superordinated RTN building block, with also the "deepest" nested RTN building block having access to these pieces of information of all RTN building blocks "levels".

The processing output set of the RTN building block "levels" is the processing output set of the last RTN building block which is introduced in the RTN building block "levels" at the last repeatable decision position 70.

RTN Building Block "Processing_SameParents"

This RTN building block was shown in FIG. 12 and explained above and is listed in the group of "special" set allocations because its set allocation does not correspond to the general description for variant 3.

All RTN building blocks introduced into this RTN building block are not allocated the processing output set of the RTN building block situated immediately before, but instead the processing input set of the RTN building block processing_SameParents. The processing output sets of the RTN building block processing_SameParents are all elements of all processing output sets of all elements which were introduced into this RTN building block. Depending on the additional RTN building blocks as parameter, the processing output set of this RTN building block can also include only those elements which are present in all or a particular (exact, minimum or maximum) number. By means of RTN parameter elements one can also determine whether those elements which are multiply present in processing output sets are multiply stored several times in the processing output set of this element or should be stored only once or not be included at all.

RTN Building Block "Processing_PrevParents"

All RTN building blocks introduced in this RTN building block are allocated as processing input set the processing output set of the RTN building block right before which makes this RTN building block correspond to set allocation according to variant 3. This RTN building block makes it possible that, for example, in the RTN building block processing_SameParents or in other RTN building blocks which allow for only one decision position 70, one RTN building block can deliver the processing output set of several consecutively and stepwise subsequently carried out processing functions.

RTN Building Block "BreakOn"

Each processing function is independently carried out on all input data sets in the processing input sets. If the dividing up into several data sets is to take place, this can be done by the RTN building block "BreakOn", with in each case elements of the processing input set of the RTN building block "BreakOn" which delivers the same values for the processing output set of the RTN building block that is introduced at the first decision position 70 (when there are several elements in this processing output set, the use of "ALL" and "ANY", respectively, is useful) being written into the respectively same data sets.

The combining into a data set, for example, can be determined by at least one keyword (e.g. "END", "BREAKON") after a decision position 70 which can be repeated as often as desired in the RTN building block "BreakOn".

RTN Building Block "GroupBy"

Each element of the processing input set and the processing output sets can in each case be allocated one set of values.

Many problems make it necessary to group according to identical values and for each grouped element optionally memorizes those elements that were grouped together with this element. This is determined by the RTN building block "GroupBy", while it is possible to write all elements of the sets that are allocated according to element in the processing output set of the RTN building block "GroupBy" and thereby removing the grouping after the completion of the processing functions. This can be determined by at least one keyword (e.g. "END GROUPBY") after a decision position 70 that can be called as often as desired. If in the statement no such keyword is given, the grouping remains from the first use on for all subsequent processing functions in the respective subordinate RTN building block.

RTN Building Block "OrderBy"

The elements of each set are always disposed in a certain order. After the optimization, not every processing function adheres to this order.

Therefore, there is provided an RTN building block ("OrderBy") that stores the elements of all input data sets of its processing input set independently from each other according to the sorted given value and the value set, respectively.

Each useful set processing function and value calculation function, respectively, or also display function etc. can be defined by an RTN building block and carried out in the query. In the following there are listed some examples of set processing functions.

RTN Building Block "WHERE"

This RTN building block is used to determine for each element of the processing input set that this element is written only into the processing output set when the RTN building block at the decision position 70 of this RTN building block "WHERE" delivers a value that is not zero. In case a set of values is delivered, definitions can be determined by the RTN building blocks "ALL" and "ANY", respectively, at the decision position 70.

RTN Building Block "MIN"/"MAX"

If from one data set in each case only those elements are to be selected which correspond to the biggest and smallest values, respectively, of a calculation for each element of the entire set, this can be determined by the RTN building blocks "MIN" and "MAX", respectively. If a certain set of the biggest and smallest values, respectively, are to be delivered, this can be carried out by a superordinated RTN building block ("set elements") which limits the number of elements of the processing output set of its RTN building blocks introduced at the decision position 70.

RTN Building Block "Set Elements Limiting"

If from the respectively current data set of a processing output set, based on the current sorting, only a certain number of elements is to be delivered, in this case an RTN building block "set elements limited" can be used as subordinate RTN building block. This RTN building block determines that exactly the Xth element ("="), all elements up to ("<=") or starting from the (">=") Xth element of its processing input set is retrieved in its processing output set. A limitation can also be determined to a certain percentage with regard to the number of elements of the current data set in the processing input set ("%").

RTN Building Block "FIND"

Each processing function is respectively carried out on all input data sets of its processing input set for each element, and the elements of the data set of the processing output set are taken as processing input set for the subordinate and subsequent RTN building block, respectively.

By using a particular RTN building block ("FIND"), it will be determined that the processing output set of the RTN building block "FIND" corresponds to the processing output set of this RTN building block without being changed, with the characterization that those elements which are present in the processing output set of the RTN building block which is introduced in the RTN building block "FIND" at the decision position 70, are marked in the delivered order in the processing output set of the RTN building block "FIND". Subsequent RTN building blocks each then independently carry out their processing functions on the respectively marked elements, instead of the entire set of data, with regard to the subsequent elements (RTN building block "NEXT") or the previous elements (RTN building block "PREV"). Further on the elements found in the processing functions are only marked. When using this RTN building block, the previous application of the RTN building block "ORDERBY" is quite useful.

If later an access to the entire set of data is to be carried out, this can be done, for example, by an extension in the RTN building block "FIND", which enables the calling of the decision position 70 as often as desired after a keyword that follows one of the first decision positions 70 (e.g. ":") and then necessarily prescribes at least one keyword (e.g. "END", "FIND"). Once this keyword is found, all marked elements of the processing output set of the last RTN building block in the RTN building block "FIND" at the decision position 70, which can be called as often as possible, are written into the processing output set of this RTN building block, and no other elements are marked any further, so that subsequent processing functions again access the entire set of data.

RTN Building Blocks "NEXT"/"PREV"

Each processing function is applied individually on each element in the processing data set. By doing so, it becomes possible, for example, to compare respective current elements with the values of subsequent ("NEXT") or previous ("PREV") elements. If the RTN building block "NEXT" has no superordinated RTN building block, from the entire set in each case only the Xth element ("="), all elements up to the Xth element ("<=") or all elements starting from the Xth element (">=") are delivered as processing output set of this RTN building block.

RTN Building Block "ANY"/"ALL"

For example, in the RTN building block "comparison", which compares the processing output sets of the RTN building blocks introduced at both decision positions 70, in cases where at least one of the introduced RTN building blocks returns a set of values, it can be determined whether all ("ALL") returned values or at least one ("ANY") of the returned values must match when being compared. In "ANY" 0 it can also be determined that exactly ("="), at least (">=") or a maximum of ("<=") a certain number of elements must match for the comparison. In "ALL" it can be said that the comparison must match to exactly ("="), at least ("<=") or a maximum of (">=") X elements.

RTN Building Block "Intermediate Set"

If the processing output set of an RTN building block is to be stored for further processings with other RTN building blocks, this can be carried out by a superordinated RTN building block "intermediate set". This RTN building block indicates that its processing input set is temporarily stored in the set stated as variable name and can be used by all subsequent RTN building blocks as processing input set.

RTN Building Block "DO LOOP"

Certain problems may require that after each element of the processing input set of the RTN building block, which is introduced in the decision position 70 after the keywords "DO" ":" in the RTN building block "DO LOOP", with its element being subjected to the processing function of the introduced RTN building block, the processing output set of the RTN building block, which was stated at the decision position 70 after the keyword "UNTIL", is examined against not zero or not ZERO, and that depending thereon, the processing functions for this RTN building block are ended.

EXAMPLE 19

Take all companies of Vienna until the turnover2006 of the selected companies makes a total of more than 100,000 €.

```
SELECT
    DO :
        WHERE (companies.city="VIENNA")
    LOOP UNTIL
        SUM (companies.turnover2006) > 100000
```

By means of an RTN building block "set element forming" (",") these two processing output sets of the RTN building blocks, introduced at both decision positions 70 of this RTN building block, are combined into a combined processing output set of this RTN building block.

Further RTN building blocks are the RTN building blocks "table RTN building block" and "table field RTN building block", respectively, which contain the names of all tables and stored queries and table and query fields, respectively, in the current relational database as well as the RTN building blocks "variable", "number", "constants" (definition of valid constants), "global functions" (for a user to define embedded functions in another language, such as "CurrentUser( )"), RTN building blocks for comparisons (">", ">=", "<=", "<>", "=", "BETWEEN", "IN", . . . ), for logical operations ("AND", "OR", "XOR", . . . ), for the logical negation ("NOT"), for the combination into RTN building blocks ("( )") and for computer operations ("+", "−", "*", "/", "\", "^", "mod", "SQR", "LIM", . . . ).

A preferred variant are RTN building blocks for aggregate functions ("count", "all", "none", "sum", "AVG", "percent", . . . ) which are applied each on the elements of the processing input set allocated to them and which redeliver for each input data set exactly one value in their output data set.

RTN building blocks for data manipulation and data output, respectively, are necessary. Prior art commands of this kind can be suitably taken on as RTN building blocks, as is the case with "SELECT", "UPDATE", "INSERT INTO" and "DELETE", for example.

RTN building blocks can be introduced which define the SQL-usable join links "left join", "right join", inner join" and "outer join". There can be RTN building blocks that contain functions of OLAP, T-SQL, GEO-SQL and functions defined in other SQL extensions.

Furthermore, it is possible to define convertible RTN building blocks, as is the case with RTN building block "IN", for example: Value IN (1, 2, 3, 4, 5) can be defined as RTN building block * "IN" "(*")", with * "," * being an RTN building block of its own.

The RTN building block IN is identical with value=ANY (1, 2, 3, 4, 5) and can be either converted into these RTN building blocks or processed by the engine as such. The same holds for possible RTN building blocks UNION (ALL), INTERSECT, EXCLUDE which either combine sets without (UNION) or with (UNION ALL) duplicates and take only elements that are present in both stated sets (INTERSECT) or take only elements which are present in neither of the two sets (EXCLUDE). These RTN building blocks can be represented in combination with the RTN building blocks "ANY"/"ALL" with optionally the RTN building block "GroupBy" and can also be converted into these RTN building blocks.

---

(1, 2, 3, 4) UNION ALL (3, 4, 5, 6) = ANY (>=1)(1, 2, 3, 4), (3, 4, 5, 6)
>=1 is taken as standard and need not be stated.
(1, 2, 3, 4) UNION (3, 4, 5, 6) = GROUPBY ANY (>=1)(1, 2, 3, 4), (3, 4, 5, 6)
can be processed differently by the optimizer
(1, 2, 3, 4) INTERSECT (3, 4, 5, 6) = ALL (1, 2, 3, 4), (3, 4, 5, 6)
(1, 2, 3, 4) EXCLUDE (3, 4, 5, 6) = ANY (=1) (1, 2, 3, 4), (3, 4, 5, 6)

---

As is evident, it is possible to make much more precise descriptions with more than two sets by ANY and ALL, as it would be the case with UNION etc. A definition of these RTN building blocks can also be carried out for reasons of compatibility with SQL as well as for reasons of a more convenient applicability, especially because the presence of a multiplicity of RTN building blocks does not pose a disadvantage.

The same can be done with the RTN building blocks "AND", "OR"/"XOR":

These RTN building blocks can be represented by combining the RTN building blocks "ANY"/"ALL" with the RTN building block "processing_SameParents" and can be converted into these RTN building blocks.

---

WHERE (companies.industry="sale") AND
(MAX(companies.[employees.count])#100)
=
ALL companies.//WHERE (industry="sale") MAX([employees.count])#100⊕⊕
WHERE (companies.industry="sale") OR (MAX (companies.[employees.count])#100)
=
ANY (>=1) companies.//WHERE (industry="sale") MAX([employees.count])#100⊕⊕
WHERE (companies.industry="sale") XOR
(MAX(companies.[employees.count])#100)
=
ANY (=1) companies.//WHERE (branch="sale") MAX([employees.count])#100⊕⊕
WHERE (companies.industry="sale") AND (companies.[employees.count]>100)
may, for example, also be represented in this way because the processing output set
of the first outer RTN building block "WHERE" is handed over to the second outer
RTN building block "WHERE" as processing input set:
WHERE (companies.industry="sale") WHERE (companies.[employees.count]>100)

---

Further convertible RTN building blocks are, for example, the RTN building block "set elements limiting", which can be converted into the RTN building block "FOR-NEXT", "IF THEN ELSE", which can be converted into the RTN building block "SELECT CASE", the RTN building block "count", which can be converted into the RTN building block "SUM" and "1", etc.

A query consists of an RTN building block, concretely the RTN level element which comprises a necessary number of RTN building blocks in a given order.

By definition there are RTN building blocks which start with a decision position 70 in the decision graph. For determining the used RTN building blocks in each statement it is necessary to carry out a conversion step prior to the application of the selection steps on the first statement in order to divide up the RTN building blocks into two generic groups and to memorize the corresponding generic group for each RTN building block for the further processing.

In a conversion step prior to the application of the selection step, each RTN building block is allocated to either a first or a second generic group, with the RTN building blocks beginning with text, symbol, variable or number being allocated to the first generic group and being converted in such a way that the decision positions which include a recursive query function the selection step of which is applied to all RTN building blocks, are limited to the extent that the selection step can only be applied to the RTN building block of the first generic group, and the RTN building blocks beginning with a recursive query function being allocated to the second generic group and are being converted in such a way that the first decision position is removed, and with decision positions which include a recursive query function the selection step of which is applied to all RTN building blocks, being limited to the extent that the selection step is only applied to the RTN building block of the first generic group, and all RTN building blocks of the first generic group and those RTN building blocks of the second generic group ending with a text, symbol, variable or number at the last decision position being appended an optionally executable decision position at the last position where the selection step is only applied to the RTN building blocks of the second generic group.

As an example, in the following the conversion of an RTN building block without decision position 70 as first decision position in the decision graph is shown:

"("*")"

is converted into

"(" RTN building block of first generic group ")" [RTN building block of second generic group]

As an example, in the following the conversion of an RTN building block with decision position 70 as first decision position and with decision position 70 as last decision position in the decision graph is shown:

*("+"|"−")* is converted into ("+"|"−") RTN building block of first generic group

As an example, in the following the conversion of an RTN building block with decision position 70 as first decision position and without decision position 70 as last decision position in the decision graph is shown:

* "IN" "("*")"

is allocated to the second generic group and converted into

"IN" "(" RTN building block of first generic group ")" [RTN building block of second generic group]

This conversion step ensures that each given statement can be transformed into RTN building blocks through prior art algorithms, thus making it possible to use the full flexibility of the RTN building blocks when formulating queries.

Following this conversion step each RTN building block starts with at least one text, at least one symbol, one variable or one number, and each selection step is from then on only applied to RTN building blocks of the first generic group or only on RTN building blocks of the second generic group. Furthermore, after this conversion step, RTN building blocks of the second generic group are optionally called only at the last decision position of a decision graph.

Specifically, the required conversion into the two generic groups leads to a nesting of the RTN building blocks, which does not apply to the further processing because in each case one RTN building block of the first generic group, if present in the statement, calls an RTN building block of the second generic group, with this RTN building block of the second generic group always being superordinated to at least this calling RTN building block of the first generic group.

By definition there are RTN building blocks which start with a decision position 70 in the decision graph. In these RTN building blocks it cannot be confirmed clearly for multiple nestings which RTN building blocks they are superordinated to because at one decision position 70 all RTN building blocks of the first or second generic group can be introduced, which is not clear in nestings of RTN building blocks.

EXAMPLE 20

The following simple example serves to explain the above:

WHERE A+B/C

In the first step the nesting of the RTN building blocks is shown after having executed the selection steps on the statement.

WHERE RTN building block of the first generic group [RTN building block of the second generic group]
   A [RTN building block of the second generic group]
     + RTN building block of the first generic group
       B [RTN building block of the second generic group]
        / RTN building block of the first generic group
          C [RTN building block of the second generic group]

Now it is clear that for the RTN building block "+" at the first decision position 70 there are the following two introduction possibilities:

| * (WHERE *) | + | * |
| * (A) | + | * |

In the same way, there are two introduction possibilities for the second decision position 70 of the RTN building block "+":

| * | + | * (B) |
| * | + | * (* / *) |

For the RTN building block "/" there are the following three introduction possibilities for its first decision position 70:

| * (WHERE *) | / | * |
| * (* + *) | / | * |
| * (B) | / | * |

For the RTN building block "/" there is only one introduction possibility for its second decision position 70:

| * | / | * (B) |

For clearly and correctly solving these simple as well as more complex cases it is necessary to allocate to each RTN building block a first and second weighting, with the weighting for the individual RTN building blocks being determined according to the following method, taking into account the nesting among one another of all RTN building blocks found in the statement:

Each RTN building block is allocated a first weighting by means of which the nesting of the RTN building blocks is changed into a nesting that is usable for subsequent processings during each selection step or after having applied all selection steps by superordinating RTN building blocks with a higher first weighting in each case to the originally superordinating RTN building blocks which have a comparably lower first weighting.

The first weighting of all RTN building blocks of the first generic group depends on RTN building blocks of the second generic group which are directly superordinated in the statement, which is why the first weighting that is allocated to the RTN building blocks of the first generic group is described as initial weighting.

The RTN building blocks of the first generic group have an identical first initial weighting, preferably of an average height, and these RTN building blocks of the first generic group, when being introduced into RTN building blocks of the second generic group, take on their first weighting which is decreased by a single value, preferably by one.

As an example the RTN building block "table field" receives, as all other RTN building blocks of the first generic group as well, a first initial weighting 200, with the RTN building block "addition/subtraction operations" having a weighting 17.

Taken "A" (table field) "+" (addition/subtraction operations) "B" (table field), both RTN building blocks table field, instead of their original first initial weighting 200, are allocated the first weighting 17, decreased by one, of the RTN building block addition/subtraction operations which is to be superordinated to them. Both table field RTN building blocks thus receive, due to the statement, a weighting 16 and are both, because of their low first weighting (16), subordinated to the addition/subtraction operations RTN building block (weighting 16).

The first weighting for the RTN building blocks of the second generic group is determined as follows:

Those RTN building blocks of the second generic group which apply their processing function to the processing output set of a processing function of an RTN building block of the first or second generic group form a first generic subgroup of the second generic group, and each is allocated the same first weighting which is not the highest possible weighting but higher than the first initial average height weighting of the RTN building blocks of the first generic group.

In this way, for example, the processing function RTN building blocks * "UNION" *, * "#" * and * "AS" V:variable name is each applied to the processing output set and processing output sets, respectively, of the RTN building blocks of the first or second generic group, which are directly introduced at their decision position 70, which is why the RTN building blocks of the first generic subgroup are allocated to the second generic group and receive a first weighting of 250, with 200 being the first weighting of the RTN building blocks of the first generic group and 255 being assumed as the highest possible weighting.

As a result, it is ensured that the RTN building blocks of the first generic subgroup of the second generic group are always superordinated to the RTN building blocks of the first and second generic group, and therefore, by definition are allocated their processing output set as their processing input set.

Those RTN building blocks of the second generic group the processing output set of which is taken as processing input set for other RTN building blocks of the first or second generic group, form a second generic subgroup of the second generic group and are allocated a respectively different first weighting which in any case is smaller than the first initial average height weighting of the RTN building blocks of the first generic group, and this first weighting for the respective RTN building blocks individually describes the predeterminable order of the processing with regard to the RTN building blocks of the second generic subgroup of the second generic group by allocating, in each case, a lower first weighting to the respectively first to execute RTN building block of this group.

Thus, for example, the RTN building block "multiplication/division operations" receives a first weighting 14, the RTN building block "addition/subtraction operations" receives a higher first weighting 17, the RTN building block "comparison" receives a first weighting 50 and the RTN building block "Bool combination" receives a first weighting 100.

This becomes clear from the desired nesting of: A+B*C>D AND E=F

All first weightings stated herein are smaller than the first initial weighting 200 of the RTN building blocks of the first generic group.

In order to exclude wrong nestings in the RTN building blocks of the first and second generic group in which after a decision position 70 at least a further decision position follows before the optionally added last decision position 70, which is added after the conversion step, the allocation of a second weighting of maximal height for exactly these RTN building blocks becomes necessary. Concrete, wrong nestings would otherwise result just exactly when at least one RTN building block of the first generic subgroup of the second generic group is introduced in these RTN building blocks at a decision position 70 which is not last, i.e. an RTN building block which has a higher weighting than the average weighting height of the RTN building blocks of the first generic group. These RTN building blocks, despite their higher first weighting, must not be nested over RTN building blocks with a maximum second weighting until these RTN building blocks with a maximum second weighting in the decision path have reached the last optionally introduced decision position 70 after the conversion step.

Therefore, all RTN building blocks of the first and second generic group in which after a decision position 70 that prescribes introducing at least one RTN building block of the first generic group, at least a further decision position follows independently from the last optional decision position 70, which is optionally present after the conversion step and prescribes introducing an RTN building block of the second generic group, are allocated a second, fixed weighting with the highest possible weighting height.

The RTN building block "WHERE" serves as an example of an RTN building block of the first generic group which by definition is not allocated a second weighting of maximum height:

"WHERE" * after conversion step:

"WHERE" RTN building block of the first generic group [RTN building block of second generic group]

In this RTN building block no other decision position after the first decision position 70 follows, with the exception of the last, optional decision position 70, added by the conversion step. Thus, the second weighting for this RTN building block can receive the value of the first weighting of this RTN building block.

The RTN building block "summarizing RTN building block" (in brackets) and the RTN building block "for next" are two examples of RTN building blocks of the first generic group which by definition are allocated a second weighting of maximum height:

"("*")" after conversion step:

"(" RTN building block of the first generic group ")" [RTN building block of the second generic group]

"FOR" * ":" * "NEXT" after conversion step:

"FOR" RTN building block of the first generic group ":" RTN building block of the first generic group "NEXT" [RTN building block of the second generic group]

In these RTN building blocks each time at least one decision position follows always additionally to the last, optional decision position 70, added by the conversion step, after each first decision position 70. Thus, the second weighting for these RTN building blocks corresponds to the highest possible weighting height, concretely 255.

The same holds for the RTN building blocks of the second generic group. This is shown, for example, for the RTN building block "addition/subtraction operations" and for the RTN building block "IN comparing":

*("+"|"−")* after conversion step
("+"|"−") RTN building block of the first generic group In this RTN building block after the conversion step no other decision position follows after the only decision position 70. Thus, the second weighting for this RTN building block can, for example, receive the value of the first weighting of this RTN building block.

*"IN""("*")" after conversion step:
"IN" RTN building block of the first generic group [RTN building block of the second generic group]

In this RTN building block a decision position follows after the first decision position 70, additionally to the last, optional decision position 70, added by the conversion step. Thus, the second weighting for this RTN building block corresponds to the highest possible weighting height, concretely 255.

For determining the nesting which is necessary for the further processing of each RTN building block with regard to each RTN building block in the statement, superordinated thereto by the execution of the selection steps after the conversion step, it applies that the first weighting of each RTN building block of the second generic group in the nesting order which results from the query statement after the conversion step, is compared with the first weighting of the respective superordinated RTN building block until the respective RTN building block of a higher first weighting or the respective superordinated RTN building block which is not located at its last decision position and has a second weighting of the highest possible weighting, is reached, and according to this determined nesting order the RTN building block, acting as the basis for the comparison, is directly subordinated to the reached RTN building block and thus superordinated to all RTN building blocks which were skipped in the comparisons and had been previously superordinated.

This is explained by the following example:

EXAMPLE 21

IF A THEN WHERE B=C #5 ELSE WHERE D=E #10 END IF #20

The nesting which applies for the further processing in this example is as follows:

| | |
|---|---|
| *(1.1) # *(1.2) | first weight. 250, second weight 250 |
| (=1.1) IF *(2.1) THEN *(2.2) ELSE *(2.3) END IF | first weight. 200, second weight. 255 |
| (=2.1) A | first weight. 200, second weight. 1 |
| (=2.2) *(3.1) # *(3.2) | first weight. 200, second weight. 200 |
| (=3.1) *(4.1) = *(4.2) | first weight. 50, second weight. 50 |
| (=4.1) B | first weight. 49 (initial 200), second weight. 1 |
| (=4.2) C | first weight. 49 (initial 200), second weight. 1 |
| (=3.2) 5 | first weight. 249 (initial 200), second weight. 1 |
| (=2.3) *(5.1) # *(5.2) | first weight. 250, second weight. 250 |
| (=5.1) *(6.1) = *(6.2) | first weight. 50, sec. weight. 50 |
| (=6.1) D | first weight. 49 (initial 200), second weight. 1 |
| (=6.2) E | first weight. 49 (initial 200), second weight. 1 |
| (=5.2) 10 | first weight. 249 (initial 200), second weight. 1 |
| (=1.2) 20 | first weight. 249 (initial 200), second weight. 1 | with first weight . . . being first weighting
second weight . . . being second weighting
initial . . . being the initial weighting of the RTN building blocks of the first generic group which is stated if it is changed by the introduction into an RTN building block of the second generic group.

Here, it can be seen that the RTN building block "#" having a first weighting 250 is only superordinated to the RTN building block "IF THEN ELSE END IF" having a first weighting 200 and a second weighting 255 after this has reached its last decision position.

For the sake of completeness of the description of example 21, the nesting shall be shown which in this example results from the execution of the selection steps after the conversion step:

| | |
|---|---|
| IF | Call: RTN building block of the first generic group |
| A | |
| THEN | Call: RTN building block of the first generic group |
| WHERE | Call: RTN building block of the first generic group |
| B | Call: RTN building block of the second generic group |
| = | Call: RTN building block of the first generic group |
| C | Call: RTN building block of the second generic group |
| # | Call: RTN building block of the first generic group |
| 5 | |
| ELSE | Call: RTN building block of the first generic group |
| WHERE | Call: RTN building block of the first generic group |
| D | Call: RTN building block of the second generic group |
| = | Call: RTN building block of the first generic group |
| E | Call: RTN building block of the second generic group |
| # | Call: RTN building block of the first generic group |
| 10 | |
| END IF | Call: RTN building block of the second generic group |
| # | Call: RTN building block of the first generic group |
| 20 | |

RTN building blocks of the first generic group are subordinated to the RTN building block of the first or second generic group which is directly superordinated to them, independent of their own and of the first weighting of the RTN building blocks superordinated to them.

EXAMPLE 22

WHERE A+MIN B
Example 22 is nested as follows:

| | |
|---|---|
| WHERE * (1.1) | first weight. 200, second weight. 200 |
| (=1.1) *(2.1) + *(2.2) | first weight. 50, second weight. 50 |
| (=2.1) A | first weight. 49 (initial 200), second weight. 1 |
| (=2.2) MIN *(3.1) | first weight. 49 (initial 200), second weight. 200 |
| (=3.1) B | first weight. 200, second weight. 1 |

As can be seen from example 22, the RTN building block "B", as an RTN building block of the first generic group, is subordinated with its first weighting 49 which is changed by its superordinated RTN building block of the second generic group "+", despite its higher first weighting 200, when compared with the thereto superordinated RTN building block "MIN".

If a superordinated RTN building block with the same first weighting is present when comparing the first weighting of RTN building blocks of the second generic group, the proceedings vary depending on the respective generic subgroup:

If the RTN building block of the second generic group which is to be compared with one of the superordinated RTN building block that is also of the second generic subgroup has the same first weighting, the RTN building block which needs to be compared is directly subordinated to this RTN building block, given these RTN building blocks are RTN building blocks of the second generic subgroup of the second generic group.

The following example serves to explain the above:

EXAMPLE 23

| WHERE A MOD B / C \ D | |
|---|---|
| WHERE *(1.1) | first weight. 200, second weight. 200 |
| (=1.1) *(2.1) MOD *(2.2) | first weight. 14, second weight. 14 |
| (=2.1) A | first weight. 13 (initial 200), second weight. 1 |
| (=2.2) *(3.4) / *(3.2) | first weight. 14, second weight. 14 |
| (=3.1) B | first weight. 13 (initial 200), second weight. 1 |
| (=3.2) *(4.1) \ *(4.2) | first weight. 14, second weight. 14 |
| (=4.1) C | first weight. 13 (initial 200), second weight. 1 |
| (=4.2) D | first weight. 13 (initial 200), second weight. 1 |

In example 23, when comparing the first weighting, RTN building blocks of the second generic subgroup of the second generic group meet twice ("/" meets "MOD", "\" meets "/"). Due to the allocation to the second generic subgroup of the second generic group, these RTN building blocks are each subordinated because it is defined that the processing output set of the subordinated RTN building blocks is taken as processing input set of each superordinated RTN building block. By using the RTN building block "RTN building block summarizing", i.e. by bracketing, another first and second weighting and thus another computing order is obtained.

If the RTN building block of the second generic group which is to be compared has the same first weighting as one of the superordinated RTN building blocks that are also of the second generic subgroup, the comparison with the superordinated RTN building blocks is continued as long as these RTN building blocks are RTN building blocks of the first generic subgroup of the second generic group.

The following example serves to explain the above:

EXAMPLE 24

Take all elements for which A applies. From this set take the first 100, store these 100 elements in the intermediate set1 and from this intermediate set1 take the first 50 elements.

| WHERE A # 100 AS intermediate set # 50 | |
|---|---|
| *(1.1) # *(1.2) | first weight. 250, second weight. 250 |
| (=1.1) *(2.1) AS Zwischenmenge | first weight. 250, second weight. 250 |
| (=2.1) *(3.1) # *(3.2) | first weight. 250, second weight. 250 |
| (=3.1) WHERE *(4.1) | first weight. 249 (initial 200), second weight. 200 |
| (=4.1) A | first weight. 200, second weight. 1 |
| (=3.2) 100 | first weight. 249 (initial 200), second weight. 1 |
| (=1.2) 50 | first weight. 249 (initial 200), second weight. 1 |

In example 24, when comparing the first weighting, RTN building blocks of the first generic subgroup of the second generic group meet twice ("AS" meets "#", "#" meets "AS"). Due to the allocation to the first generic subgroup of the second generic group, these RTN building blocks are each prearranged because it is defined that the processing output set of the subordinated RTN building blocks is taken as processing input set of each superordinated RTN building block.

It is important that RTN building blocks which are directly introduced into a decision position 70 of an RTN building block of the highest possible second weighting are only subordinated to RTN building blocks of the second generic group if it is desired for the respective RTN building block. This is done by a method wherein the RTN building blocks of the first generic group which are predetermined to be subordinated to the RTN building blocks of the second generic group when the RTN building blocks of the first generic group are directly introduced into one of the decision positions of the RTN building block at which one from the total of RTN building blocks is introducible, with the RTN building block having a second highest possible weighting height, are allocated a second weighting of minimum weighting height, and the RTN building blocks of the first generic group which have no second weighting of a minimum height, in such cases, are not subordinated to RTN building blocks of the second generic group.

Two examples are to show the nesting for these two possible cases which, after the above described method, results in the following:

EXAMPLE 25

First possible case: At the decision position 70 of the superordinated RTN building block of the second weighting with the highest possible weighting height, an RTN building block of the first generic group of a second weighting is introduced that is not the weighting of the minimum weighting height, with the keyword in the example being "WHERE":
[WHERE MAX A+B/C=D]

The nesting which applies for the further processing in example 25 is as follows:

| | |
|---|---|
| [ *(1.1) ] | first weight. 200, second weight. 255 |
| (=1.1) WHERE *(2.1) | first weight. 200, second weight. 200 |
| (2.1) *(3.1) = *(3.2) | first weight. 50, second weight. 50 |
| (=3.1) MAX *(4.1) | first weight. 49 (initial 200), second weight. 200 |
| (=4.1) *(5.1) + *(5.2) | first weight. 17, second weight. 17 |
| (=5.1) A | first weight. 16 (initial 200), second weight. 1 |
| (=5.2) *(6.1) / *(6.2) | first weight. 14, second weight. 14 |
| (=6.2) B | first weight. 13 (initial 200), second weight. 1 |
| (=6.3) C | first weight. 13 (initial 200), second weight. 1 |
| (=3.2) D | first weight. 49, second weight. 200 |

The RTN building block "MAX" is subordinated to the RTN building block with the keyword "/" because its superordinated RTN building block "WHERE" has no weighting of the highest possible weighting height.

The RTN building block "WHERE" is to be subordinated to the RTN building block with the keyword "=" according to the global definition, which does not happen in this case because its superordinated RTN building block "levels" ("[ ]") has the second highest possible weighting height while the RTN building block "WHERE" does not have the second weighting of a minimum weighting height.

If a different nesting of the RTN building blocks is to be effected, this can be done by using the RTN building block "RTN building block summarizing" ("( )"), e.g. WHERE (MAX (A+B/C)=D), equivalent to MAX A+B/C

EXAMPLE 26

Second possible case: At the decision position 70 of the subordinate RTN building block with second weighting of the highest possible weighting height there is introduced an RTN building block of the first generic group with a second weighting of a minimum weighting height, which is keyword "A" in the example:

| [ A + B ] | |
|---|---|
| [ *(1.1) ] | first weight. 200, second weight. 255 |
| (=1.1) *(2.1) + *(2.2) | first weight. 17, second weight. 17 |
| (=2.1) A | first weight. 16 (initial 200), second weight. 1 |
| (=2.2) B | first weight. 16 (initial 200), second weight. 1 |

Example 26 shows that the RTN building block "addition/subtraction operations" is superordinated to the RTN building block "table field" (A) because the RTN building block "A" is directly introduced in the decision position 70 of the RTN building block "levels", the RTN building block A has a second weighting of a minimum weighting height and the directly superordinated RTN building block "levels" has a second weighting of the highest possible weighting height.

A further embodiment of the invention is given in cases where, according to the statement, RTN building blocks of the second generic group which, after the conversion step, are followed by an optional decision position that prescribes introducing an RTN building block of the second generic group, are introduced an RTN building block of the second generic group at exactly this optional decision position.

In such cases the RTN building block introduced at this last decision position is always and independent of the first and second weightings of the two RTN building blocks in question superordinated to the previously superordinated RTN building block.

This is illustrated by the following example which indicates that the value of field A in the variant "intermediate set" is to be stored, to this variable "intermediate set" the value of field B is to be added and then examined whether this value corresponds to value C, and that the result of this comparison in turn is to be stored in the variable "ResultIN".

A AS intermediate set+B IN (C) AS result IN

Here, despite its lower first weighting 17, the RTN building block with the keyword "+" is superordinated to the RTN building block with the keyword "AS" with the first weighting 250. The same happens with regard to the RTN building blocks with the keywords "IN" and "AS", with the first weighting of the RTN building block having the keyword "AS" that has to be superordinated, independently being higher (250) than the first weighting (60) of the RTN building block having the keyword "IN".

According to the RTN building blocks, RTN building block groups can also be defined as statements or parts of statements which, for example, include only processing functions of the arithmetic or logic type. For such cases it is agreed that all RTN building blocks of the first and second generic group can be allocated at least one RTN building block which is and are, respectively, to be superordinated when the RTN building blocks of the first and second generic group are directly introduced in a decision position of an RTN building block with the highest possible second weighting at which one from all of the RTN building blocks can be introduced.

In parts, the following RTN building blocks contain the allocations stated below as long as they are directly introduced in a decision position 70 of an RTN building block of a second weighting with the highest possible weighting height:

RTN building block "table field": This RTN building block can be automatically prefixed a "SELECT" RTN building block, the RTN building block "table" which contains the name of the table in this field as well as the RTN building block "value linkage" to relate the two RTN building blocks "table" and "table field" to each other.

EXAMPLE 27

[TABLE_FIELD_NAME]
which, after the automatic prefixing, results in:
[SELECT TABLE_NAME.TABLE_FIELD-NAME]

RTN building block "table": This RTN building block can be preceded with a "SELECT" RTN building block for the delivery of all table fields.

EXAMPLE 28

[TABLE_NAME]
which, after the automatic prefixing, results in:
[SELECT TABLE_NAME.*]

RTN building blocks that carry out computing or comparative operations: These RTN building blocks can be prefixed a "WHERE" RTN building block, and if also not present, a "SELECT" RTN building block which, for example, delivers all fields of all used tables with the respectively necessary RTN building blocks "set element forming" and "value linkage".

EXAMPLE 29

[A+B]
which, after the automatic prefixing, results in:

---
[ SELECT TABLE_NAME.A, TABLE_NAME.B
WHERE TABLE_NAME.A + TABLE_NAME.B ]
---

Table 1 and table 2 contain a list of possible RTN building blocks with respective first and second weightings and the decision graph of the RTN building blocks, in which, when the decision graph of the RTN building blocks is run at the decision positions, the keywords of the query statements are compared, depending on the associated mark, either with a text, a symbol, a variable or a number or an RTN building block is inserted from the total of RTN building blocks, which in turn is again run.

Because of the fact that at each decision position 70 one can always select from the total of RTN building blocks, more degrees of freedom are possible when formulating query statements, as compared with a limited choice at the decision positions.

The RTN building block "NEXT" is to serve as an example which redelivers from its processing input set per current element the next elements listed at the decision position 70 in its processing output set.

If instead of the decision position 70, for example, only a number was allowed, only the number of the next elements which are to be delivered per current element could be determined, and by means of the decision position 70 at the first decision position 70 of which in turn the RTN building block "WHERE" is introduced, those elements could be delivered by the RTN building block "set elements limiting" which follow the current element and are located in the processing output set of the RTN building block "set elements limiting". Accordingly, this applies to all RTN building blocks. By means of the RTN building block "MAX", for example, exactly the subsequent element with the highest listed value in the decision position 70 of the RTN building block "MAX" could be searched, starting from the current element.

The following, abstracted example serves to illustrate this.

EXAMPLE 30

---
ORDERBY A
NEXT (WHERE B=C # 100)
NEXT (MAX D # 20)
---

Here, the set is sorted by value A, following which exactly those 100 elements are delivered for each element of the set where the comparison B=C applies. From this set, the set of the subsequent 20 elements is then delivered the value D of which is among the 20 highest, starting from the current element.

EXAMPLE 31

The position of the share named test share as per Jan. 1, 2006 is to be found and taken for further computation in that the number of days having passed until the share has risen by 20% since that date is to be displayed.

WHERE (shares.name="test share")
ORDERBY shares.date
FIND WHERE (shares.date=Jan. 01, 2006) AS positionJan. 01, 2006
SELECT NEXT (WHERE (shares.position>=positionJan. 01, 2006*1.2 #1).date-shares.date Description of the Statement in Example 31:
Search the share named "test share"
Sort these shares by date
Search exactly the element where the date is Jan. 1, 2006 and store this element in the variable positionJan. 01, 2006.

Based on the element marked by "FIND" as the current element, those shares are to be searched the position of which, starting from the current element, is greater by 20% than the value stored in the variable positionsJan. 01, 2006.

1 limits the elements found by WHERE to the first element, and therefore, NEXT also delivers only the value of the first element for which WHERE applies.

NEXT must be used to enable the comparison of the values of the found elements with a value of the current element, with the number of days passed being computed in the example in this way.

Display of the result by the keyword SELECT.

In this connection, for example, the following marks are used:

Decision positions given in [ ] are to be carried out only optionally, expected keywords are indicated by " ", ("keyword1"|"keyword2") represent "keyword1" OR "keyword2", * represents the decision position 70, (x) and (*x), respectively, each mark jump positions from one position (*x) to another position (x) and V:variable name and V:number, respectively, stand for a freely selectable variable and number, respectively.

The RTN building blocks are arranged in the order that approximately corresponds to the frequency of usage of these RTN building blocks in a statement, so that frequent RTN building blocks can be found earlier and as little comparisons as possible are needed.

The RTN building blocks are shown both before the conversion step (table 1) into the two generic groups and after the conversion step (table 2).

It should be noted that this list can be conveniently extended anytime by further RTN building blocks, therefore not being exhaustive.

In order to reach an optimized access plan, the RTN building blocks which are nested according to their order in the statement and according to their weighting and allocated certain RTN building block groups, must each be converted in engine interface elements, with one engine interface element having a record of independent components that can be set according to the processing step.

The inventive method is also suitable for programmatically setting up a relational database system which comprises at least a computer system with at least a relational database, at least a data processing unit and at least a memory, usually, for example, as a computer program, having the respective instructions which are set up for carrying out the method.

Such a computer program can have any form. Specifically, it can be a computer program product on a computer-readable medium, such as a floppy disk, CD or DVD having computer program code means by which a computer is prompted by the program to carry out the method each time after having loaded the computer program, in order to generate an inventive data carrier or electronic carrier signal. However, it can, for example, also be a computer program product having a computer program on an electronic carrier signal where each time after the loading of the computer program a computer is prompted by the program to carry out the inventive method.

TABLE 1

RTN building blocks: without decision position 70 on first position, before conversion

| | |
|---|---|
| Table field RTN building block | 200/1 |
| Table field RTN building block::: = ("A" | "B" | "C" | "D" | "E" | "F" | "G" | "H" | "I" | "J" | "K" | "L" | "M" | "N" | "O" | "P" | "Q" | "R" | "S" | "T" | "U" | "V" | "W" | "X" | "Y" | "Z" | "department_ID" | "company_#" | "department_name" | "company_ID" | "company_name" | "ZIP" | "city" | "country" | "no._of_employees" | "assessment" | contact_person_ID" | "department_#" | "surname" | "name" | "function_#" | "function_ID" | "title" | "invoice_ID" | "event_#" | "invoice_date" | "event_ID" | "contact_person_#" | "event_date" | "PAX" | "invoice_sum" | "amount_VAT_10" | "amount_VAT_20") | |
| Table RTN building block | 200/1 |
| Table RTN building block::: = | 200/1 |
| ("ABC" | "departments" | "companies" | "contact_persons" | "contact_persons_functions" | "invoices" | "events") | |
| Numbers/text RTN building block | 200/1 |
| Numbers/text RTN building block::: = V:number, text | |
| Line selecting RTN building block | 200/200 |
| Line selecting RTN building block::: = "WHERE" * | |
| Extreme value RTN building block | 200/200 |
| Extreme value RTN building block:: = ("MIN" | "MAX") * | |
| Levels RTN building block | 200/255 |
| Levels RTN building block::: = "[(*1)]"] | |
| RTN building blocks combining RTN building block | 200/255 |
| RTN building blocks combining RTN building block::: = "(" * ")" | |
| Processing_SameParents RTN building block | 200/255 |
| Processing_SameParents RTN building block::: = "/" "/" (1) * [(*1)] "\" "\" | |
| Processing_PrevParents RTN building block | 200/255 |
| Processing_PrevParents RTN building block::: = "RESULTOF" "(" (1) * [(*1)] ")" | |
| Set sorting RTN building block | 200/255 |
| Set sorting RTN building block::: = "ORDERBY" * (1) ["DESC"["," * (*1)]] | |
| Aggregate RTN building block, parameter-free | 200/200 |
| Aggregate RTN building block, parameter-free:: = ("count" | "exists" | "none" | "all") | |
| Aggregate RTN building block, 1 parameter | 200/200 |
| Aggregate RTN building block, 1 parameter:: = | |
| ("sum" | "AVG" | "return" | "min_value" | "max_value") * | |
| All/any RTN building block | 200/200 |
| All/any RTN building block::: = ("ALL" | "ANY") ["(" [("<" "=" | ">" "=" | "=")] V:Number ")"] * | |
| FIND RTN building block | 200/255 |
| Find RTN building block::: = "FIND" * [":" (1) * [(*1)] "END" "FIND"] | |
| Constants RTN building block | 200/200 |
| Constants RTN building block:::: = ("TRUE" | "FALSE" | "date" | "year" | "month" | "month_year" | "week" | "day" | "time" | "hour" | "minute" | "hour_minute") | |
| NEXT/PREV RTN building block | 200/255 |
| NEXT/PREV RTN building block::: = ("NEXT" | "PREV") ["(" [("=" | ">" "=" | "<" "=")] * ")"] | |
| FOR next RTN building block | 200/255 |
| FOR next RTN building block::: = "FOR" * ":" * "NEXT" | |
| Rel. Bool RTN building block | 200/200 |
| Rel. Bool RTN building block:: = ("FINDNEXT" | "FINDPREV") * | |
| Rel. line selecting RTN building block | 200/200 |
| Rel. line selecting RTN building block::: = ("MUSTNEXT" | "MUSTPREV") * | |
| Do loop until RTN building block | 200/255 |
| Do loop until RTN building block::: = ("DO" ":" * "LOOP" "UNTIL" * | "DO" "UNTIL" * ":" * "LOOP") | |
| Abs. Bool RTN building block | 200/200 |
| Abs. Bool RTN building block::: = ("FIRST" | "LAST") * | |
| If then RTN building block | 200/255 |
| If then RTN building block::: = "IF" * "THEN" * ["ELSE" *] ["END IF"] | |
| Select case RTN building block | 200/255 |
| Select case RTN building block::: = "SELECT" "CASE" * ":" (1) "CASE" [("<" ">" | "=" | ">" "=" | "<" "=")] * ":" * [(*1)] ["CASE" "ELSE" ":"*] ["END" "SELECT"] | |
| Negating Bool RTN building block | 200/200 |
| Negating Bool RTN building block::: = "NOT" * | |
| SELECT RTN building block | 200/200 |
| SELECT RTN building block::: = "SELECT" * | |
| Group break RTN building block | 200/255 |
| Group break RTN building block::: = "BREAKON" * [":" (1) * (*1)] "END" "BREAKON"] | |
| Line combining RTN building block | 200/255 |
| Line combining RTN building block:: = "GROUPBY" * [":" (1) * [(*1)] "END" "GROUPBY"] | |
| Percent RTN building block | 200/200 |
| Percent RTN building block::: = "PERCENT" | |
| Levels start input set forming RTN building block | 200/200 |
| Levels start input set forming RTN building block::: = "FROM" * | |

TABLE 1-continued

RTN building blocks: with decision position 70 on first position, before conversion

| | |
|---|---|
| Value linkage RTN building block | |
| 4/4 | |
| Value linkage RTN building block::: = * ";" * | |
| Addition/subtraction operations RTN building block | 17/17 |
| Addition subtraction operations RTN building block:: = * ("+" | "−") * | |
| Multiplication/division operations RTN building block | 14/14 |
| Multiplication/division operations RTN building block::: = * ("*" | "/" | "\" | "MOD") * | |
| Power calculation operations RTN building block | 10/10 |
| Power calculation operations RTN building block::: = * "^" * | |
| Comparative RTN building block | 50/50 |
| Comparative RTN building block::: = * ("=" | "<" | ">" | ">" "=" | "<" "=" | "<" ">") * | |
| Bool combination RTN building block | 100/100 |
| Bool combination RTN building block::: = * ("AND" | "OR" | "XOR") * | |
| Set elements limiting RTN building block | 250/250 |
| Set elements limiting RTN building block:: = * "#" [("=" | ">" "=" | "<" "=" | "<" ">")] ["%"] * | |
| Set combining RTN building block | 250/250 |
| Set combining RTN building block::: = * ("UNION" ["ALL"] | "INTERSECT" | "EXCLUDE") * | |
| Set elements forming RTN building block | 30/30 |
| Set elements forming RTN building block::: = * ";" * | |
| Intermediate set RTN building block | 250/250 |
| Intermediate set RTN building block::: = * "AS" V:intermediate set name | |
| IN comparing RTN building block | 60/255 |
| IN comparing RTN building block::: = * "IN" (" * ")" | |

TABLE 2

RTN building blocks: first generic group, after conversion

| | |
|---|---|
| Table field RTN building block | 200/1 |
| Table field RTN building block::: = ("A" | "B" | "C" | "D" | "E" | "F" | "G" | "H" | "I" | "J" | "K" | "L" | "M" | "N" | "O" | "P" | "Q" | "R" | "S" | "T" | "U" | "V" | "W" | "X" | "Y" | "Z" | "department_ID" | "company_#" | "department_name" | "company_ID" | "company_name" | "ZIP" | "city" | "country" | "no._of_employees" | "assessment" | contact_person_ID" | "department_#" | "surname" | "name" | "function_#" | "function_ID" | "title" | "invoice_ID" | "event_#" | "invoice_date" | "event_ID" | "contact_person_#" | "event_date" | "PAX" | "invoice_sum" | "amount_VAT_10" | "amount_VAT_20") [RTN building block of second generic group] | |
| Table RTN building block | 200/1 |
| Table RTN building block::: = ("ABC" | "departments" | "companies" | "contact_persons" | "contact_persons_functions" | "invoices" | "events") [RTN building block of second generic group] | |
| Numbers/text RTN building block | 200/1 |
| Numbers/text RTN building block:::=V:number, text [RTN building block of second generic group] | |
| Line selecting RTN building block | 200/200 |
| Line selecting RTN building block::: = "WHERE" RTN building block of first generic group [RTN building block of second generic group] | |
| Extreme value RTN building block | 200/200 |
| Extreme value RTN building block:: = ("MIN" | "MAX") RTN building block of first generic group [RTN building block of second generic group] | |
| Levels RTN building block | 200/255 |
| Levels RTN building block::: = "[ " (1) RTN building block of first generic group [(*1)] "]" [RTN building block of second generic group] | |
| RTN building blocks combining RTN building block | 200/255 |
| RTN building blocks combining RTN building block::: = "("RTN building block of first generic group ")" [RNT element of second generic group] | |
| Processing_SameParents RTN building block | 200/255 |
| Processing_SameParents RTN building block::: = "/" "/" (1) RTN building block of first generic group [(*1)] "\" "\" "]" [RTN building block of second generic group] | |
| Processing_PrevParents RTN building block | 200/255 |
| Processing_PrevParents RTN building block::: = "RESULTOF" "(" (1) RTN building block of first generic group [(*1)] ")" [RTN building block of second generic group] | |
| Set sorting RTN building block | 200/255 |
| Set sorting RTN building block::: = "ORDERBY" RTN building block of first generic group (1) ["DESC" ["," RTN building block of first generic group (*1)]] [RTN building block of second generic group | |
| Aggregate RTN building block, parameter-free | 200/200 |
| Aggregate RTN building block, parameter-free:: = ("count" | "exists" | "none" | "all") [RTN building block of second generic group] | |

TABLE 2-continued

| | |
|---|---|
| Aggregate RTN building block, 1 parameter<br>Aggregate RTN building block, 1 parameter::: =<br>("sum" | "AVG" | "return" | "min_value" | "max_value") RTN building block of first generic<br>group [RTNelement of second generic group] | 200/200 |
| All/any RTN building block<br>All/any RTN building block::: = ("ALL" | "ANY") ["(" [("<" "=" | ">" "=" | "=")] V:Number ")"]<br>RTN building block of first generic group [RTN building block<br>of second generic group] | 200/200 |
| FIND RTN building block<br>Find RTN building block::: = "FIND" RTN building block of first generic group [":" (1) RTN<br>building block of first generic group [(*1)] "END" "FIND"]<br>[RTN building block of second generic group] | 200/255 |
| Constants RTN building block<br>Constants RTN building block:::: = ("TRUE"<br>| "FALSE" | "date" | "year" | "month" | "month_year" | "week" | "day" | "time" | "hour" |<br>"minute" | "hour_minute") [RTN building block of second generic group] | 200/200 |
| NEXT/PREV RTN building block<br>NEXT/PREV RTN building block::: = ("NEXT" | "PREV") ["(" [("=" | ">" "=" | "<" "=")] RTN<br>building block of first generic group ")"] [RTN building block of second generic group] | 200/255 |
| FOR next RTN building block<br>FOR next RTN building block::: = "FOR" RTN building block of first generic group ":" RTN<br>building block of first generic group "NEXT" [RTN building block of second generic group} | 200/255 |
| Rel. Bool RTN building block<br>Rel. Bool RTN building block:: = ("FINDNEXT" | "FINDPREV") RTN building block of first<br>generic group [RTN building block of second generic group] | 200/200 |
| Rel. line selecting RTN building block<br>Rel. line selecting RTN building block::: = ("MUSTNEXT" | "MUSTPREV") RTN building block<br>of first generic group [RTN building block of second generic group] | 200/200 |
| Do loop until RTN building block<br>Do loop until RTN building block::: = ("DO" ":" RTN building block of first generic group "LOOP"<br>"UNTIL" RTN building block of first generic group | "DO" "UNTIL" RTN building block of first<br>generic group ":" RTN building block of first generic group "LOOP") [RTN building block of<br>second generic group] | 200/255 |
| Abs. Bool RTN building block<br>Abs. Bool RTN building block::: = ("FIRST" | "LAST") RTN building block of first generic group<br>[RTN building block of second generic group] | 200/200 |
| If then RTN building block<br>If then RTN building block::: = "IF" RTN building block of first generic group "THEN" RTN<br>building block of first generic group ["ELSE" RTN building block of first generic group] ["END<br>IF"] [RTN building block of second generic group] | 200/255 |
| Select case RTN building block<br>Select case RTN building block::: = "SELECT" "CASE" RTN building block of first generic<br>group ":" (1) "CASE" [("<" ">" | "=" | ">" "=" | "<" "=")] RTN building block of first generic<br>group ":" RTN building block of first generic group [(*1)] ["CASE" "ELSE" ":" RTN building block<br>of first generic group] ["END" "SELECT"] [RTN building block of second generic group] | 200/255 |
| Negating Bool RTN building block<br>Negating Bool RTN building block::: = "NOT" RTN building block of first generic group [RTN<br>building block of second generic group] | 200/200 |
| SELECT RTN building block<br>SELECT RTN building block::: = "SELECT" RTN building block of first generic group [RTN<br>building block of second generic group] | 200/200 |
| Group break RTN building block<br>Group break RTN building block::: = "BREAKON" RTN building block of first generic group [":"<br>(1) RTN building block of first generic group [(*1)] "END" "BREAKON"] [RTN building block of<br>second generic group] | 200/255 |
| Line combining RTN building block<br>Line combining RTN building block:: = "GROUPBY" RTN building block of first generic group<br>[":" (1) RTN building block of first generic group [(*1)] "END" "GROUPBY"] [RTN building block<br>of second generic group] | 200/255 |
| Percent RTN building block<br>[Percent RTN building block::: = "PERCENT" RTN building block of first generic group [RTN<br>building block of second generic group] | 200/200 |
| Levels start input set forming RTN building block<br>Levels start input set forming RTN building block::: = "FROM" RTN building block of first<br>generic group [RTN building block of second generic group] | 200/200 |
| RTN building blocks: second generic group, after conversion | |
| Value linkage RTN building block<br>Value linkage RTN building block::: = "." RTN building block of first generic group | 4/4 |
| Addition/subtraction operations RTN building block<br>Addition subtraction operations RTN building block:: = ("+" | "−") RTN building block of first<br>generic group | 17/17 |
| Multiplication/division operations RTN building block<br>Multiplication/division operations RTN building block::: = ("*" | "/" | "\" | "MOD") RTN building<br>block of first generic group | 14/14 |
| Power calculation operations RTN building block<br>Power calculation operations RTN building block::: = "^" RTN building block of first generic<br>group | 10/10 |

TABLE 2-continued

| | |
|---|---|
| Comparative RTN building block | 50/50 |
| Comparative RTN building block::: = ("=" | "<" | ">" | ">" "=" | "<" "=" | "<" ">") RTN building block of first generic group | |
| Bool combination RTN building block | 100/100 |
| Bool combination RTN building block:::=* ("AND" | "OR" | "XOR") RTN building block of first generic group | |
| Set elements limiting RTN building block | 250/250 |
| Set elements limiting RTN building block:: = "#" [("=" | ">" "=" | "<" "=" | "<" ">")] ["%"] RTN building block of first generic group | |
| Set combining RTN building block | 250/250 |
| Set combining RTN building block::: = ("UNION" ["ALL"] | "INTERSECT" | "EXCLUDE") RTN building block of first generic group | |
| Set elements forming RTN building block | 30/30 |
| Set elements forming RTN building block::: = ";" RTN building block of first generic group | |
| Intermediate set RTN building block | 250/250 |
| Intermediate set RTN building block::: = "AS" V:intermediate set name [RTN building block of second generic group] | |
| Comparative IN RTN building block | 60/255 |
| Comparative IN RTN building block::: = "IN" (" RTN building block of first generic group ")" [RTN building block of second generic group] | |

The invention claimed is:

1. A method for controlling a relational database system, comprising the steps of:

analyzing a query statement consisting of keywords by applying a recursive transition network (RTN) and by allocating process-related properties to the keywords or a group of the keywords in the order given by the statement; and converting a result of said step of analyzing a query statement into control commands, wherein the RTN is formed of independent RTN building blocks, wherein each RTN building block has an inner, directed decision graph which is defined independently from the inner, directed decision graphs of the other RTN building blocks with at least one decision position along at least one decision path, wherein the inner decision graphs of all RTN building blocks are run by means of the keywords in a selection step and all possible paths of this decision graph are followed until either no match with the respectively selected path is determined by the decision graph and the process is interrupted or the respectively chosen path is run until the end, and wherein the decision paths at least partly have a recursive call function on at least one of the decision positions through which one of the RTN building blocks is run as a result of applying the selection step to all of the RTN building blocks, so that any frequently recursively nested execution of the selection step starting from the at least one of the decision positions is made possible, and in that an access plan for the relational database system is generated from the order of the RTN building blocks and their nesting as a result of the application of the selection steps on all keywords, wherein, in a conversion step prior to the execution of the selection steps each RTN building block is allocated either to a first or a second generic group, wherein the RTN building blocks beginning with text, symbol, variable or number are allocated to the first generic group and converted in such a way that the decision positions which include a recursive query function the selection step of which is applied to all RTN building blocks, are limited to the extent that the selection step can only be applied to the RTN building block of the first generic group, wherein the RTN building blocks beginning with a recursive query function are allocated to the second generic group and converted in such a way that the first decision position is removed, and decision positions which include a recursive query function the selection step of which is applied to all RTN building blocks, are limited to the extent that the selection step is only applied to the RTN building blocks of the first generic group, and wherein all RTN building blocks of the first generic group and those RTN building blocks of the second generic group ending with a text, symbol, variable or number at the last decision position are appended an optionally executable decision position at the last position where the selection step is only applied to the RTN building blocks of the second generic group.

2. The method according to claim 1, wherein, when the decision graph of the RTN building blocks is run at the decision positions, the keywords of the query statements are compared, depending on the associated mark, either with a text, a symbol, a variable or a number or an RTN building block is inserted from all of the RTN building blocks, which in turn is again run.

3. The method according to claim 1 or 2, wherein in the decision graphs of the RTN building blocks those decision positions at which a not predeterminable, unlimited number of consecutive calls of recursive call functions is carried out, are prefixed at least one decision position that demands a keyword (text, symbol, variable or numeral) and are followed by at least one decision position, also demanding a keyword.

4. The method according to claim 1, wherein each RTN building block starts with at least a text, at least a symbol, variable or number and the selection step can only be applied to RTN building blocks of the first generic group or only on RTN building blocks of the second generic group.

5. The method according to claim 1, wherein the RTN building blocks of the second generic group can only be optionally called at the last decision position of a decision graph.

6. The method according to one of the previous claims 1-2, wherein each RTN building block returns, after a complete run of a decision graph as a result of at least one processing function defined for the respective RTN building block depending on at least a processing input set, a processing output set with at least one value including ZERO, wherein the order of the values within these sets is stored and each obtained processing output set can be allocated to each RTN building block as one of the processing input sets.

7. The method according to one of the previous claims 1-2, wherein each RTN building block has at least one first weighting by which the nesting of the RTN building blocks is changed into a nesting which can be used for a further processing during each selection step or after having executed all selection steps, by superordinating RTN building blocks of a higher first weighting to the respective, originally superordinated RTN building blocks which have a comparably lower first weighting.

8. The method according to claim 7, wherein the first weighting of all RTN building blocks of the first generic group depends on RTN building blocks of the second generic group which are directly superordinated in the statement, which is why the first weighting that is allocated to the RTN building blocks of the first generic group is described as the initial weighting.

9. The method according to claim 8, wherein the RTN building blocks of the first generic group have an identical first initial weighting, preferably of an average height, and these RTN building blocks, when being introduced into RTN building blocks of the second generic group, take on their first weighting which is decreased by a single value, preferably by one.

10. The method according to claim 7, wherein those RTN building blocks of the second generic group which apply their processing function to the processing output set of a processing function of an RTN building block of the first or second generic group, form a first generic subgroup of the second generic group, and each has the same first weighting which is not the highest possible weighting but higher than the first initial average height weighting of the RTN building blocks of the first generic group.

11. The method according to claim 7, wherein those RTN building blocks of the second generic group the processing output set of which is taken as processing input set for other RTN building blocks of the first or second generic group, form a second generic subgroup of the second generic group and have a respectively different first weighting which in any case is smaller than the first initial average height weighting of the RTN building blocks of the first generic group, and the first weighting for the respective RTN building blocks individually describes the predeterminable order of the processing with regard to the RTN building blocks of the second generic subgroup of the second generic group by allocating, in each case, a lower first weighting to the respectively first to execute RTN building block of this group.

12. The method according to claim 7, wherein all RTN building blocks of the first and second generic group which, after a decision position that prescribes the introduction of at least one RTN building block from the first generic group, are followed by at least one further decision position, independent of the last, optional decision position that is optionally present after the conversion step and prescribes the introduction of an RTN building block from the second generic group, have a second, fixed weighting with the highest possible weighting height.

13. The method according to claim 12, wherein the first weighting of each RTN building block of the second generic group in the nesting order resulting from the query statement after the conversion step is compared with the first weighting of each superordinated RTN building block until the respective RTN building block of a higher first weighting or the respective superordinated RTN building block which is not located at its last decision position and has a second weighting of the highest possible weighting, is reached and that, accordingly, this determined nesting order of the RTN building block, acting as the basis for the comparison, is directly subordinated to the reached RTN building block and thus superordinated to all RTN building blocks which were skipped in the comparisons and had been superordinated before.

14. The method according to claim 7, wherein RTN building blocks of the first generic group are subordinated to the RTN building block of the first or second generic group which is directly superordinated to them, independent of their own first weighting and of the first weighting of the RTN building blocks superordinated to them.

15. The method according to claim 7, wherein if the RTN building block of the second generic group which is to be compared has the same first weighting as one of the superordinated RTN building blocks also of the second generic subgroup, the RTN building block which needs to be compared is directly subordinated to this RTN building block if and only if these RTN building blocks are RTN building blocks of the second generic subgroup of the second generic group.

16. The method according to claim 7, wherein if the RTN building block of the second generic group which is to be compared with one of the superordinated RTN building blocks that are also of the second generic subgroup has the same first weighting, the comparison with the superordinated RTN building blocks is continued as long as these RTN building blocks are RTN building blocks of the first generic subgroup of the second generic group.

17. The method according to claim 12, wherein the RTN building blocks of the first generic group which are predetermined to be subordinated to the RTN building blocks of the second generic group when the RTN building blocks of the first generic group are directly introduced in one of the decision positions at which one from all of the RTN building blocks is introducible, with the RTN building block having a second highest possible weighting height, are allocated a second weighting of minimum weighting height, and in that the RTN building blocks of the first generic group which have no second weighting of minimum height, in such cases, are not subordinated to RTN building blocks of the second generic group.

18. The method according to claim 12, wherein all RTN building blocks of the first and second generic group are allocated at least one RTN building block which is and are, respectively, to be superordinated when the RTN building blocks of the first and second generic group are directly introduced in a decision position of an RTN building block with the highest possible second weighting at which one from all of the RTN building blocks can be introduced.

19. The method according to one of the previous claims 1-2, wherein the RTN building blocks which are nested according to their order in the statement and according to their weighting and are allocated certain RTN building block groups, are each converted in engine interface elements, with one engine interface element having a record of independent components that can be set according to the processing step.

20. The method according to claim 1, wherein an optimization is performed after said step of analyzing a query statement.

21. A relational database system comprising at least a computer system with at least a relational database, at least a data processing unit and at least a memory, wherein the data processing unit is programmatically set up in such a way that it works according to the aforementioned method according to any one of the claims 1 to 2.

22. The relational database system according to claim 21, wherein the relational database system has means to read into the memory a database statement or database statements given in a database language to control the relational database system of a data carrier or electronic carrier signal.

23. A computer program product having a computer-readable storage medium with computer program code embodied therein such that a computer executing said computer program code performs the method according to any one of claims 1 to 2.

* * * * *